United States Patent
Kang et al.

(10) Patent No.: US 12,506,949 B2
(45) Date of Patent: Dec. 23, 2025

(54) ELECTRONIC DEVICE AND IMAGE TRANSMISSION METHOD BY ELECTRONIC DEVICE

(71) Applicant: SAMSUNG ELECTRONICS CO., LTD., Suwon-si (KR)

(72) Inventors: Donghoon Kang, Suwon-si (KR); Jeonghwan Jeon, Suwon-si (KR); Yukyung Jin, Suwon-si (KR); Kyunghoon Cha, Suwon-si (KR); Sunyoung Min, Suwon-si (KR); Jiwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 236 days.

(21) Appl. No.: 18/096,842

(22) Filed: Jan. 13, 2023

(65) Prior Publication Data

US 2023/0156316 A1    May 18, 2023

Related U.S. Application Data

(63) Continuation of application No. PCT/KR2021/005592, filed on May 4, 2021.

(30) Foreign Application Priority Data

Jul. 16, 2020 (KR) .................. 10-2020-0087979

(51) Int. Cl.
H04N 23/63 (2023.01)
(52) U.S. Cl.
CPC ......... *H04N 23/631* (2023.01); *H04N 23/635* (2023.01)

(58) Field of Classification Search
None
See application file for complete search history.

(56) References Cited

U.S. PATENT DOCUMENTS

2009/0208068 A1  8/2009  Tsunoda
2010/0235881 A1  9/2010  Liu et al.
(Continued)

FOREIGN PATENT DOCUMENTS

CN    103593154 A    2/2014
KR    10-2015-0033308 A    4/2015
(Continued)

OTHER PUBLICATIONS

Communication dated Nov. 20, 2023, issued by the European Patent Office in European Application No. 21843156.7.
(Continued)

*Primary Examiner* — James M Hannett
(74) *Attorney, Agent, or Firm* — Sughrue Mion, PLLC

(57) ABSTRACT

An electronic device includes a first communication module; a second communication module; a sensor module; a camera module configured to capture a photographed image; and a processor configured to: determine photographing direction information of the electronic device based on sensor information received from the sensor module, determine direction information of an external electronic device based on a first signal received through the first communication module, in case that a camera interface is activated, determine a shared external electronic device based on the photographing direction information, the direction information of the external electronic device, and angle of view information of a camera, and transmit the photographed image to the determined shared external electronic device in case that a graphic object provided by the camera interface is selected.

20 Claims, 21 Drawing Sheets

(56) References Cited

U.S. PATENT DOCUMENTS

| | | |
|---|---|---|
| 2011/0064281 A1 | 3/2011 | Chan |
| 2014/0049447 A1 | 2/2014 | Choi |
| 2014/0056177 A1 | 2/2014 | Kneckt et al. |
| 2014/0368670 A1 | 12/2014 | Morley |
| 2015/0033150 A1 | 1/2015 | Lee et al. |
| 2015/0085317 A1* | 3/2015 | Kim ..................... G06F 3/0488 358/1.15 |
| 2015/0341590 A1 | 11/2015 | Choe et al. |
| 2016/0119770 A1* | 4/2016 | Ryu ......................... G01S 1/00 370/328 |
| 2016/0149633 A1 | 5/2016 | Sanderovich et al. |
| 2017/0223505 A1 | 8/2017 | Baldwin |
| 2018/0218220 A1* | 8/2018 | Jung ..................... G06V 20/30 |
| 2022/0060230 A1 | 2/2022 | Na et al. |

FOREIGN PATENT DOCUMENTS

| | | |
|---|---|---|
| KR | 10-2015-0106243 A | 9/2015 |
| KR | 10-2015-0134822 A | 12/2015 |
| KR | 10-2016-0022630 A | 3/2016 |
| KR | 10-2016-0046205 A | 4/2016 |
| KR | 10-2016-0049759 A | 5/2016 |
| KR | 10-2017-0001434 A | 1/2017 |
| KR | 10-2017-0086504 A | 7/2017 |
| KR | 10-2001594 B1 | 7/2019 |
| KR | 10-2020-0031230 A | 3/2020 |
| WO | 2020/054973 A1 | 3/2020 |

OTHER PUBLICATIONS

International Search Report dated Aug. 26, 2021, issued by the International Searching Authority in International Application No. PCT/KR2021/005592 (PCT/ISA/210).

Written Opinion dated Aug. 26, 2021, issued by the International Searching Authority in International Application No. PCT/KR2021/005592 (PCT/ISA/237).

Communication issued on Sep. 19, 2024 by the China National Intellectual Property Administration in Chinese Patent Application No. 202180061157.3.

Communication dated Sep. 22, 2025, issued by the Korean Patent Office in Korean Application No. 10-2020-0087979.

* cited by examiner

ELECTRONIC DEVICE AND IMAGE TRANSMISSION METHOD BY ELECTRONIC DEVICE

CROSS-REFERENCE TO RELATED APPLICATIONS

This application is a continuation application of International Application No. PCT/KR2021/005592, filed on May 4, 2021, which is based on and claims priority to Korean Patent Application No. 10-2020-0087979, filed on Jul. 16, 2020, in the Korean Intellectual Property Office, the disclosures of which are incorporated by reference herein in their entireties.

BACKGROUND

1. Field

The disclosure relates to an electronic device capable of determining an external electronic device related to a subject by using a frequency signal of an ultra-wide band (UWB) received through a plurality of antennas, and providing an interface capable of quickly transmitting a photographed image including the subject to the determined external electronic device, and an image transmission method by the electronic device.

2. Description of Related Art

In the related art, in order to photograph an image by an electronic device and transmit the photographed image, when a first interface (e.g., camera preview mode) of the electronic device is first selected, an image obtained from a camera may be photographed in the first interface and the photographed image may be stored. Afterwards, when a second interface (e.g., photo gallery) showing images stored in the electronic device is selected, an image for transmission may be selected from the second interface, and a transmission method (e.g., Bluetooth (BT), Wireless Fidelity (WiFi)-direct, or cellular network) for transmitting the image may be selected. When the transmission method for transmitting the image is selected in the second interface, the image may be transmitted to a selected external electronic device among external electronic devices searched in a third interface (e.g., Quick Share) corresponding to the selected transmission method.

A plurality of user interfaces may be required to capture an image by a related electronic device and to transmit the photographed image to an external electronic device, and the user may need to perform a plurality of inputs corresponding thereto to receive the plurality of interfaces.

SUMMARY

Provided are an electronic device capable of determining an external electronic device related to a subject by using a frequency signal of a UWB band received through a plurality of antennas, and providing an interface capable of quickly transmitting the photographed image including the subject to the determined external electronic device, and an image transmission method in the electronic device.

According to an aspect of the disclosure, an electronic device includes: a first communication module; a second communication module; a sensor module; a camera module configured to capture a photographed image; and a processor configured to: determine photographing direction information of the electronic device based on sensor information received from the sensor module, determine direction information of an external electronic device based on a first signal received through the first communication module, in case that a camera interface is activated, determine a shared external electronic device based on the photographing direction information, the direction information of the external electronic device, and angle of view information of a camera, and transmit the photographed image to the determined shared external electronic device in case that a graphic object provided by the camera interface is selected.

The processor may be further configured to: determine a first azimuth angle according to the photographing direction information of the electronic device, determine a second azimuth angle according to the direction information of the external electronic device based on the first signal received from the external electronic device through a plurality of antennas used by the first communication module, and determine the external electronic device as the determined shared external electronic device in case that the first azimuth angle and the second azimuth angle are included in a range of the angle of view information of the camera.

The processor may be further configured to: identify a rotationally mounting state of the electronic device, in case that the rotationally mounting state of the electronic device is a vertical rotationally mounted state, transmit and receive the first signal through at least two antennas aligned in a horizontal axis among a plurality of antennas used by the first communication module, and in case that the rotationally mounting state of the electronic device is a horizontally rotationally mounted state, transmit and receive the first signal through at least two other antennas aligned with a vertical axis among the plurality of antennas used by the first communication module.

The processor may be further configured to: provide, in the camera interface, a first graphic object providing analysis information of an image obtained from the camera module, provide, in the camera interface, a second graphic object providing identification information for a subject included in the image, and provide, in the camera interface, a third graphic object for transmitting the photographed image to the determined shared external electronic device.

The processor may be further configured to display different indicators on the third graphic object, based on at least one of the analysis information of the image acquired from the camera module, location information of the determined shared external electronic device, and identification information of the determined shared external electronic device received through the second communication module.

The processor may be further configured to display, on the camera interface, a fourth graphic object for selecting a first shared external electronic device for image transmission among a plurality of shared external electronic devices in case of determining the plurality of shared external electronic devices.

The processor may be further configured to: display, on the third graphic object, information on a first shared external electronic device among a plurality of shared external electronic devices as an indicator in case of determining the plurality of shared external electronic devices, transmit the photographed image to the first shared external electronic device in case that the third graphic object is selected, display, on the third graphic object, information on a second shared external electronic device among the plurality of shared external electronic devices as an indicator in case that the photographed image is transmitted to the first shared external electronic device, and transmit the photographed image to the second shared external electronic device in case that the third graphic object is selected.

The processor may be further configured to display, on the third graphic object, an indicator that divides a plurality of external electronic devices capable of communication through the first communication module into a shared external electronic device and a non-shared external electronic device according to a range of view angle corresponding to a photographing mode of the camera.

According to an aspect of the disclosure a method of transmitting an image of an electronic device, includes: determining photographing direction information of the electronic device based on sensor information received from a sensor module of the electronic device; determining direction information of an external electronic device based on a first signal received through a first communication module of the electronic device; determining, in case that the camera interface is activated, a shared external electronic device, based on the photographing direction information of the electronic device, the direction information of the external electronic device, and angle of view information of a camera; and transmitting, case that a graphic object provided by a camera interface of the electronic device is selected, a photographed image to the determined shared external electronic device.

The method may further include: determining a first azimuth angle according to the photographing direction information of the electronic device; determining a second azimuth angle according to the direction information of the external electronic device based on the first signal received from the external electronic device through a plurality of antennas used by the first communication module; and determining the external electronic device as the determined shared external electronic device in case that the first azimuth angle and the second azimuth angle are included in a range of the angle of view information of the camera.

The method may further include: identifying a rotationally mounted state of the electronic device; in case that the rotationally mounting state of the electronic device is a vertical rotationally mounted state, transmitting and receiving the first signal through at least two antennas aligned in a horizontal axis among a plurality of antennas used by the first communication module; and in case that the rotationally mounting state of the electronic device is a horizontal rotationally mounted state, transmitting and receiving the first signal through at least two other antennas aligned in a vertical axis among the plurality of antennas used by the first communication module.

The method may further include: providing, in the camera interface, a first graphic object providing analysis information of an image obtained from a camera module of the electronic device; providing, in the camera interface, a second graphic object providing identification information for a subject included in the image; and providing, in the camera interface, a third graphic object for transmitting the photographed image to the determined shared external electronic device.

The method may further include displaying, on the camera interface, a fourth graphic object for selecting a first shared external electronic device for image transmission among a plurality of shared external electronic devices in case that determining the plurality of shared external electronic devices are determined.

The method may further include: displaying, on the third graphic object as an indicator, information on a first shared external electronic device among a plurality of shared external electronic devices in case that the plurality of shared external electronic devices are determined; transmitting the photographed image to the first shared external electronic device in case that the third graphic object is selected; displaying, on the third graphic object as an indicator, information on a second shared external electronic device among the plurality of shared external electronic devices in case that the photographed image is transmitted to the first shared external electronic device; and transmitting the photographed image to the second shared external electronic device in case that the third graphic object is selected.

The method may further include displaying, on the third graphic object as an indicator, a plurality of external electronic devices capable of communication through the first communication module according to the angle of view range corresponding to a photographing mode of the camera module divided into a shared external electronic device and a non-shared external electronic device.

The method may further include displaying different indicators on the third graphic object, based on at least one of the analysis information of the image acquired from the camera module, location information of the determined shared external electronic device, and identification information of the determined shared external electronic device received through the second communication module.

According to an aspect of the disclosure a non-transitory computer-readable storage medium stores computer-executable instructions configured, when executed by one or more processors of an electronic device, to cause the electronic device to: determine photographing direction information of the electronic device based on sensor information received from a sensor module of the electronic device; determine direction information of an external electronic device based on a first signal received through a first communication module of the electronic device; in case that a camera interface is activated, determine a shared external electronic device, based on the photographing direction information, the direction information of the external electronic device, and angle of view information of a camera; and transmit the photographed image to the determined shared external electronic device in case that a graphic object provided by the camera interface is selected.

The computer-executable instructions, when executed by the one or more processors of an electronic device, further cause the electronic device to: determine a first azimuth angle according to the photographing direction information of the electronic device; determine a second azimuth angle according to the direction information of the external electronic device based on the first signal received from the external electronic device through a plurality of antennas used by the first communication module, and determine the external electronic device as the determined shared external electronic device in case that the first azimuth angle and the second azimuth angle are included in a range of the angle of view information of the camera.

The computer-executable instructions, when executed by the one or more processors of an electronic device, further cause the electronic device to: identify a rotationally mounting state of the electronic device; in case that the rotationally mounting state of the electronic device is a vertical rotationally mounted state, transmit and receive the first signal through at least two antennas aligned in a horizontal axis among a plurality of antennas used by the first communication module; and in case that the rotationally mounting state of the electronic device is a horizontally rotationally mounted state, transmit and receive the first signal through at least two other antennas aligned with a vertical axis among the plurality of antennas used by the first communication module.

The computer-executable instructions, when executed by the one or more processors of an electronic device, further cause the electronic device to: provide, in the camera interface, a first graphic object providing analysis information of an image obtained from the camera module of the electronic device; provide, in the camera interface, a second graphic object providing identification information for a subject included in the image; and provide, in the camera interface, a third graphic object for transmitting the photographed image to the determined shared external electronic device.

According to one or more embodiments, the electronic device may determine a shared external electronic device for sharing an image related to a subject based on a frequency signal of an ultra-wide band (UWB) band received through a plurality of antennas in the camera interface, and transmit the photographed image to the shared external electronic device, thereby providing the convenience of quickly sharing the image at a time without the user's additional input for determining the sharing target.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

Figure 1:
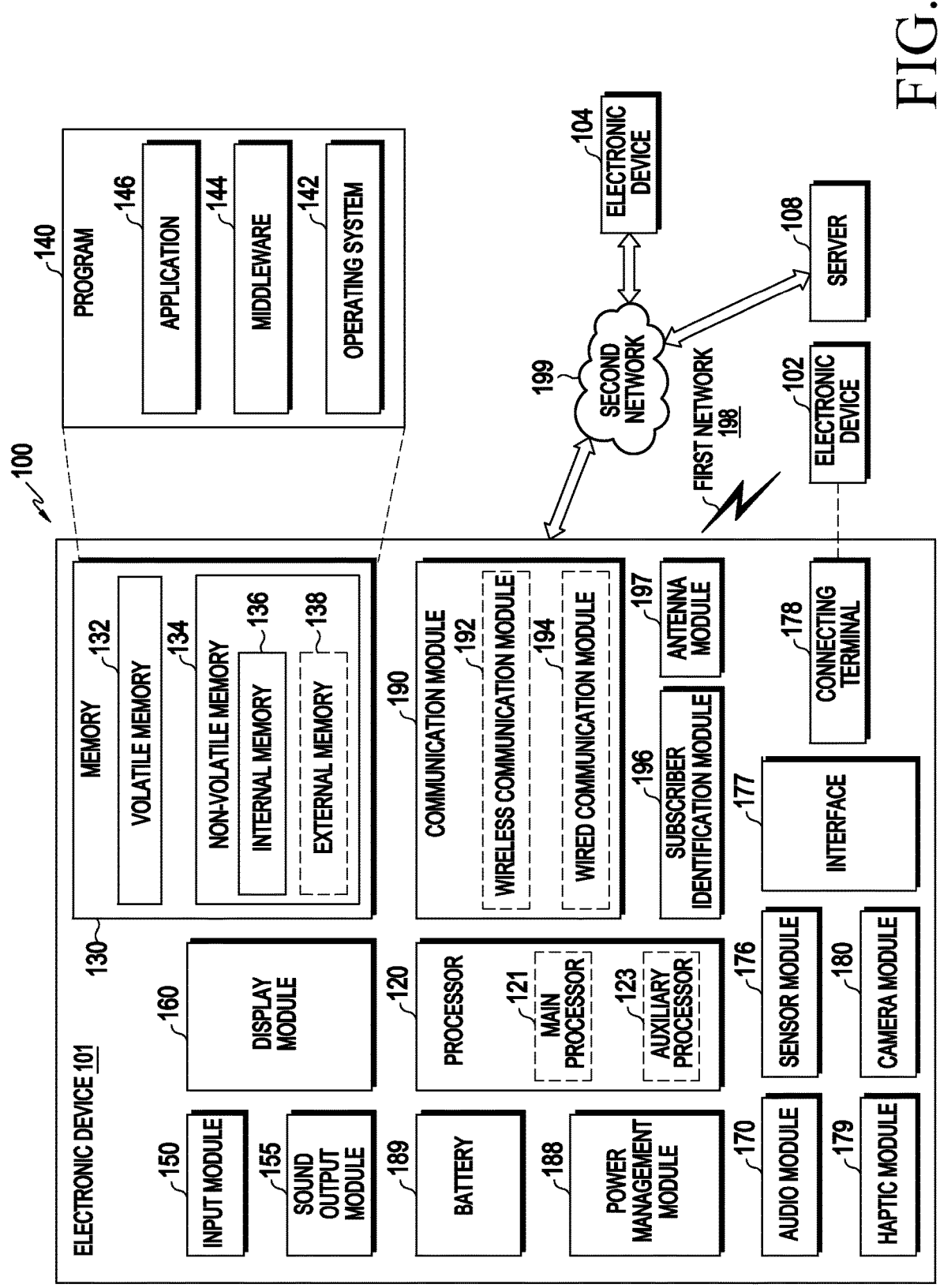
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module (sensor) 176, an interface 177, a connecting terminal 178, a haptic module 179, a camera module (camera) 180, a power management module 188, a battery 189, a communication module 190 (communication interface), a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
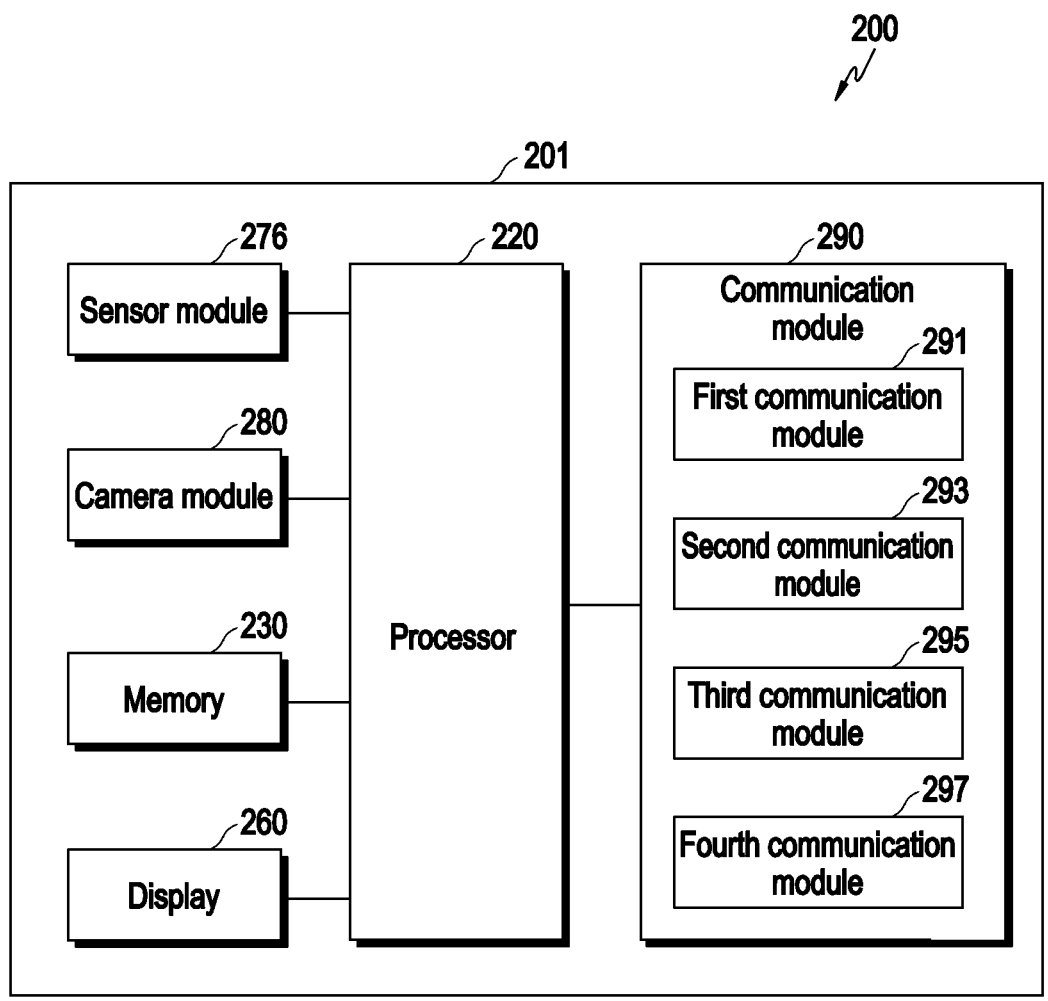
FIG. 2 is a block diagram of an electronic device, according to various embodiments.

FIG. 2 is a block diagram 200 of an electronic device according to various embodiments.

Referring to FIG. 2, the electronic device 201 (e.g., the electronic device 101 of FIG. 1) may include a processor 220, a memory 230, a display 260, a sensor module (or sensor) 276, a camera module (or camera) 280, and/or a communication module (or communication interface) 290.

According to various embodiments, the processor 220 may control the overall operation of the electronic device 201, and may be the same as the processor 120 of FIG. 1, or may perform at least one function or operation performed by the processor 120.

According to various embodiments, when the camera interface is activated on the display 260, the processor 220 may determine an external electronic device for image sharing, based on the sensor information received from the sensor module 276, a plurality of pieces of duplicate (e.g., identical) signal information received through the first communication module 291, and/or the angle of view information of the camera corresponding to the currently set photographing mode, and may transmit a photographed image to an external electronic device for sharing the image based on selection of a graphic object provided by the camera interface. The plurality of duplicate signals may indicate signals obtained by receiving one response signal using a plurality of antennas of the electronic device 201. For example, a ranging response signal transmitted from the external electronic device in response to the ranging request signal transmitted from the electronic device 201 to the external electronic device may represent the same frequency signal of ultra-wide band (UWB) band received through a plurality of UWB antennas.

According to an embodiment, the external electronic device may indicate an electronic device capable of transmitting and/or receiving UWB signals (e.g., a ranging request message and/or a ranging response message) to and/or from the electronic device 201 through an ultra-wide band (UWB) communication module (e.g., the first communication module 291).

According to an embodiment, the shared external electronic device may indicate an external electronic device capable of sharing an image among at least one external electronic device capable of transmitting and/or receiving a UWB signal through the electronic device 201 and the ultra-wide band (UWB) communication module that is (e.g., the first communication module 291).

According to an embodiment, the non-shared external electronic device may indicate an external electronic device that does not share an image among at least one external electronic device capable of transmitting and/or receiving a UWB signal through the electronic device 201 and the ultra-wide band (UWB) communication module (e.g., the first communication module 291).

According to an embodiment, the shared external electronic device may indicate an electronic device related to a subject included in the image acquired from the camera module 280 in the camera interface (e.g., camera preview mode). For example, while displaying an image including the first user obtained from the camera module 280 in the camera interface (e.g., camera preview mode), the first external electronic device of the first user that may be near the first user may be determined as the shared external electronic device. According to an embodiment, the processor 220 may use the sensor information received from the sensor module 276 to determine a first azimuth angle that may be changed according to the photographing direction information of the electronic device facing the subject. The processor 220 may determine the first azimuth angle including a photographing direction of the electronic device that is a relative direction from the magnetic north direction, which may be referred to as an absolute orientation, based on the raw data received from the sensor module 276. The sensor module 276 may include a 9-axis motion sensor and may include, for example, an acceleration sensor, a gyro sensor, or a geomagnetic sensor, and the acceleration sensor, the gyro sensor, and the geomagnetic sensor may be configured as a three-axis sensor. The processor 220 may determine azimuth information, roll information and/or pitch information using the 9-axis motion sensor, and may determine the azimuth information using a geomagnetic sensor.

According to an embodiment, the processor 220 may determine a second azimuth angle that may be changed according to direction information of the external electronic device using the plurality of duplicate signals received from the external electronic device through the first communication module 291. The processor 220 may calculate a time for transmitting and/or receiving a UWB signal (e.g., a ranging request message and/or a ranging response message) between the electronic device 201 and the external electronic device through the first communication module 291, an ultra-wide band (UWB) communication module to determine distance information (e.g., ranging information) between the electronic device 201 and the external electronic device. The processor 220 may receive a ranging response signal from the external electronic device through a plurality of antennas, and may determine distance information and direction information (e.g., angle of arrival (AOA)), which indicate location information of the external electronic device, using a difference between a first reception time of a ranging response signal received through a first antenna among the plurality of antennas and a second reception time of a ranging response signal received through a second antenna among the plurality of antennas. The processor 220 may acquire magnetic north direction information, which may be referred to as an absolute orientation, through the sensor module 276. The processor 220 may determine the second azimuth angle based on a difference in azimuth between the magnetic north direction, which may be referred to as an absolute orientation, and a relative orientation, which may indicate direction information (e.g., angle of arrival (AOA)) of the external electronic device. The processor 220 may set the first azimuth angle determined through the sensor module 276 as a reference direction, and may determine the second azimuth angle by relatively calculating direction information (e.g., angle of arrival (AOA)) of the external electronic device from the reference direction.

According to an embodiment, the processor 220 may determine a third azimuth angle that may be changed according to the movement direction information of the electronic device through the third communication module 295, for example. The processor 220 may determine the third azimuth angle including a moving direction of the electronic device as the third communication module 295 receives satellite location information through a global navigation satellite system (GNSS) communication module.

According to an embodiment, the processor 220 may determine UWB communication compatibility information from the first information (e.g., Bluetooth Low Energy (BLE) packet message and/or user registration information) received through the second communication module 293, and may activate the first communication module 291 to perform UWB communication with an external electronic device based on the UWB communication compatibility information.

According to an embodiment, the processor 220 may determine the angle of view range of the camera corresponding to the currently activated photographing mode among the plurality of photographing modes (e.g., ultra-wide mode, wide mode, telephoto mode, panorama mode, single take mode, and/or video mode) according to the activation of the camera interface.

According to an embodiment, the processor 220 may determine the external electronic device that has transmitted the response signal to the first communication module 291 as the shared external electronic device, when the first azimuth angle including the photographing direction of the electronic device from the magnetic north direction toward the subject and the second azimuth angle including the direction of the external electronic device from the magnetic north direction are included in the range of view of the camera. The processor 220 may set the first azimuth angle determined through the sensor module 276 as a reference direction, and may determine the second azimuth angle by relatively calculating direction information (e.g., angle of arrival (AOA)) of the external electronic device from the reference direction.

According to an embodiment, the processor 220 may determine the external electronic device that has transmitted the response signal to the first communication module 291 as the shared external electronic device, when the first azimuth angle including the photographing direction of the electronic device from the magnetic north direction toward the subject, the second azimuth angle including the direction of the external electronic device from the magnetic north direction, and the third azimuth angle including the moving direction of the electronic device are all included in the angle of view of the camera. For example, when the third azimuth angle is further included, the accuracy of the location information of the external electronic device may be improved.

According to an embodiment, the processor 220 may monitor the data of the first azimuth angle, the second azimuth angle, and the third azimuth angle, and may perform an error correction operation on the data for the corresponding azimuth when at least one of the first azimuth angle, the second azimuth angle, and the third azimuth angle is out of a predetermined range.

According to an embodiment, when the camera interface of the display 260 is activated, the processor 220 may display a first graphic object providing analysis information of an image obtained from the camera module 280 (e.g., the first graphic object 1130 of FIG. 11), a second graphic object (e.g., the second graphic object 1150 of FIG. 11) that provides identification information on the subject included in the image, and a third graphic object (e.g., the third graphic object 1170 of FIG. 11) for transmitting the photographed image to the shared external electronic device, on the camera interface.

According to an embodiment, the processor 220 may analyze the image acquired from the camera module 280 in real time on the camera interface, and display a first graphic object (e.g., a scene message) corresponding to the analysis result. The processor 220 may receive the first graphic object corresponding to the scene analysis result of the image obtained from the camera module 280 through an artificial intelligence (AI) server (e.g., the electronic device 104 or the server 108 of FIG. 1) connected to a network or the processor 220 included in the processor 220, and may display the same on the camera interface. For example, the first graphic object may display information about a face, a person, a scene, or an object as a first graphic object as a result of scene analysis for an image obtained from the camera module 280.

According to an embodiment, the processor 220 may display a second graphic object (e.g., the second graphic objects 1150a and 1150b of FIG. 11) that provides identification information on a subject included in the image obtained from the camera module 280) on the camera interface. The processor 220 may detect a subject included in the image obtained from the camera module 280, and may display the second graphic object corresponding to the identification information in an area adjacent to the subject displayed in the image when the identification information for the subject is registered in the memory 230. The processor 220 may determine a location of an adjacent area corresponding to a location that does not cover a subject (e.g., a face) recognized through a face recognition function, and may display the second graphic object in the determined adjacent area. When the identification information for the subject included in the image is not registered in the memory 230, the processor 220 may display a second graphic object indicating that there is no identification information near the subject displayed in the image. For example, the first user may be detected using a face recognition function in the image obtained from the camera module 280, and when the face authentication information of the first user is registered in the memory 230, name information of the first user corresponding to the face authentication information of the first user may be displayed as a second graphic object in an area adjacent to the first user displayed in the image. The face authentication information may include profile information of the first user, and the profile information of the first user may include image (e.g., photo) information of the first user and personal information (e.g., name information) stored to correspond to the image information. According to an embodiment, the processor 220 may display a third graphic object (e.g., the third graphic object 1170 of FIG. 11) capable of transmitting the photographed image to the shared external electronic device.

According to an embodiment, when any one of the video mode, panorama mode, or single take mode is activated in the camera interface, the processor 220 may start photographing when a third graphic object corresponding to the start is input, may determine a shared external electronic device based on a ranging response signal received from the external electronic device during the photographing period, may end the photographing when the third graphic object corresponding to the end is input, and may automatically transmit the photographed video file to the shared external electronic device.

According to an embodiment, the processor 220 may simultaneously display images obtained from the front camera and the rear camera of the camera module 280 in the camera interface. The processor 220 may display a first image acquired from the rear camera on a first partial region of the camera interface, and may display a second image acquired from the front camera on a second partial region of the camera interface. The processor 220 may display an indicator including a plurality of location icons indicating each of a plurality of peripheral external electronic devices capable of transmitting and/or receiving UWB signals through the first communication module 291 on the third graphic object for transmitting the photographed image. When displaying the indicator on the third graphic object, the processor 220 may change and display a location icon (e.g., a location icon corresponding to the first shared external electronic device included in the first shared area c1 mapped to the angle of view range A1 of the camera of FIG. 18) indicating a first shared external electronic device related to the subject included in the first image, a location icon (e.g., a location icon corresponding to a non-shared external electronic device included in the non-shared area c2 that is not mapped to the angle of view range A1 to A2 of the camera of FIG. 18) indicating a non-shared external electronic device, and a location icon (e.g., a location icon corresponding to the second shared external electronic device included in the second shared area c3 mapped to the angle of view range A2 of the camera of FIG. 18) indicating a second shared external electronic device related to a subject included in the second image, depending on the camera's field of view range, which is changed to correspond to the type of the photographing mode of the camera. According to an embodiment, when the camera interface (e.g., camera preview mode) is activated, the processor 220 may store the image acquired from the camera module 280 while the camera interface is activated in a first area of the memory 230 (e.g., an area for storing images for a predetermined time when the camera interface is activated), may detect an image corresponding to the selection time of the third graphic object from among the images stored in the first area of the memory 230 as a photographed image when the third graphic object is selected, may store the detected photographed image in the second area of the memory 230 (e.g., an area for storing an image selected by a user through a third graphic object, for example, an area corresponding to a photo gallery), and may convert the detected photographed image according to a set transmission method and transmission quality information (e.g., HD/FHD/UHD/4K/8K) to transmit the same to the shared external electronic device. The set transmission method may use the second communication module 293 and/or the fourth communication module 297 to effect the transmissions. For example, the second communication module 293 may use a short-range communication network such as Bluetooth, WiFi direct, or IrDA, and the fourth communication module 297 may use a long-distance network such as a legacy cellular network, a 5G network, a next-generation communication network, the Internet, or a computer network, but is not limited to the above-described example.

According to an embodiment, the processor 220 may temporarily store the image acquired from the camera module 280 in a buffer for a predetermined time when the camera interface is activated, may store the image corresponding to the selection time of the third graphic object as a photographed image in the second area of the memory 230 when the third graphic object is selected while the frame corresponding to the image is temporarily stored in a buffer for a predetermined time, and may convert the photographed image stored in the second area of the memory 230 according to a set transmission method and transmit the same to the shared external electronic device.

According to an embodiment, the processor 220 may display model information of the shared external electronic device or name information designated by the user of the shared external electronic device or the user of the electronic device on the third graphic object as an indicator. The processor 220 may display different indicators on the third graphic object, based on at least one of analysis information of the image acquired from the camera module 280 in the camera interface, location information from shared external electronic devices (e.g., distance information and/or direction information), and identification information of the shared external electronic device received through the second communication module 293. The processor 220 may display an indicator indicating a type of a subject (e.g., a person or a device) included in an image and a direction of a shared external electronic device on the third graphic object, based on the analysis information of the image acquired from the camera module 280 and/or the location information (e.g., distance information and/or direction information) of the shared external electronic device determined using the first communication module 291.

According to an embodiment, the processor 220 may display an indicator indicating the type of the subject (e.g., device) included in the image and the direction of the shared external electronic device on the third graphic object, based on analysis information of the image acquired from the camera module 280, location information (e.g., distance information and/or direction information) of the shared external electronic device determined using the first communication module 291, and/or identification information of the shared external electronic device included in the first information (e.g., BLE packet message) received through the second communication module 293. When the type of the subject is determined to be a thing (e.g., an external electronic device) based on the analysis information of the image acquired from the camera module 280, the processor 220 may transmit an image (e.g., an image including a user of the external electronic device) related to information on the thing (e.g., an external electronic device) to the thing (e.g., an external electronic device). When the type of the subject is determined to be an object (e.g., an external electronic device) based on the analysis information of the image acquired from the camera module 280, the processor 220 may connect with the object (e.g., an external electronic device) through a pairing operation, and may transmit a photographed image to the connected object (e.g., an external electronic device) to share the photographed image with the object (e.g., an external electronic device) in real time. According to an embodiment, the processor 220 may display an indicator indicating the direction of the shared external electronic device on the third graphic object, based on the location information (e.g., distance information and/or direction information) of the shared external electronic device determined using the first communication module 291.

According to an embodiment, the processor 220 may change the third graphic object provided by the camera interface into a third graphic object for transmitting the photographed image to the shared external electronic device according to user's choice or a third graphic object for storing the photographed image in the memory 230 without transmission. The processor 220 may provide a third graphic object (e.g., the third graphic object 1570 of FIG. 15) for transmitting the photographed image on the camera interface and a fifth graphic object (e.g., the fifth graphic object 1590 of FIG. 15) for storing the photographed image in the memory 230 without transmission.

According to an embodiment, the processor 220 may identify that a plurality of subjects are included in the image obtained from the camera module 280, and when the processor 220 determines a plurality of shared external electronic devices related to each of the plurality of subjects, may display a fourth graphic object (e.g., the fourth graphic object 1390 of FIGS. 13A and 13B) for selecting a shared external electronic device for image transmission among the plurality of shared external electronic devices on the camera interface.

According to an embodiment, the processor 220 may identify that a plurality of subjects are included in the image obtained from the camera module 280, and when the plurality of shared external electronic devices related to each of the plurality of subjects are determined, may sequentially transmit the photographed images to the plurality of shared external electronic devices according to an input of the third graphic object (e.g., the third graphic object 1570 of FIG. 15) from the camera interface. For example, the processor 220 may display information on the first shared external electronic device among the plurality of shared external electronic devices on the third graphic object as an indicator, and may transmit a photographed image to the first shared external electronic device when the third graphic object is selected. The processor 220 may display information as an indicator on a second shared external electronic device among the plurality of shared external electronic devices on the third graphic object when the photographed image is transmitted to the first shared external electronic device, and may transmit the photographed image to the second shared external electronic device when the third graphic object is selected.

According to an embodiment, the processor 220 may identify that a plurality of subjects are included in the image obtained from the camera module 280, and may automatically transmit the photographed image to the plurality of shared external electronic devices sequentially according to the input of the third graphic object when a plurality of shared external electronic devices related to each of the plurality of subjects are determined. The processor 220 may provide an indicator indicating the transmission progress of the photographed image over time to the third graphic object while the photographed image is automatically transmitted. For example, when the third graphic object is input, while automatically transmitting the photographed image to a plurality of shared external electronic devices in sequence, the processor 220 may provide an indicator (e.g., the indicators 1580a to 1580b of FIG. 15) for displaying a time progress indicating a transmission progress state of the photographed image over time in a predetermined area (e.g., outer shell region) (e.g., e1 to e2 in FIG. 15) of the third graphic object. When the third graphic object is input again while transmitting the photographed image to the plurality of shared external electronic devices, the transmission operation to the plurality of shared external electronic devices may be stopped. According to an embodiment, the processor 220 may search for a plurality of peripheral external electronic devices capable of transmitting and/or receiving UWB signals through the first communication module 291 to the camera interface, and may display a fifth graphic object providing a plurality of location icons representing each of the plurality of external electronic devices based on distance information and/or direction information of each of the plurality of external electronic devices. When displaying a plurality of location icons indicating each of the plurality of external electronic devices on the fifth graphic object, the processor 220 may distinguish and display a location icon indicating a shared external electronic device in which the first azimuth angle and the second azimuth angle are included in the range of view of the camera and a location icon indicating a non-shared external electronic device in which the first azimuth angle and the second azimuth angle are not included in the angle of view range of the camera.

Figure 17:
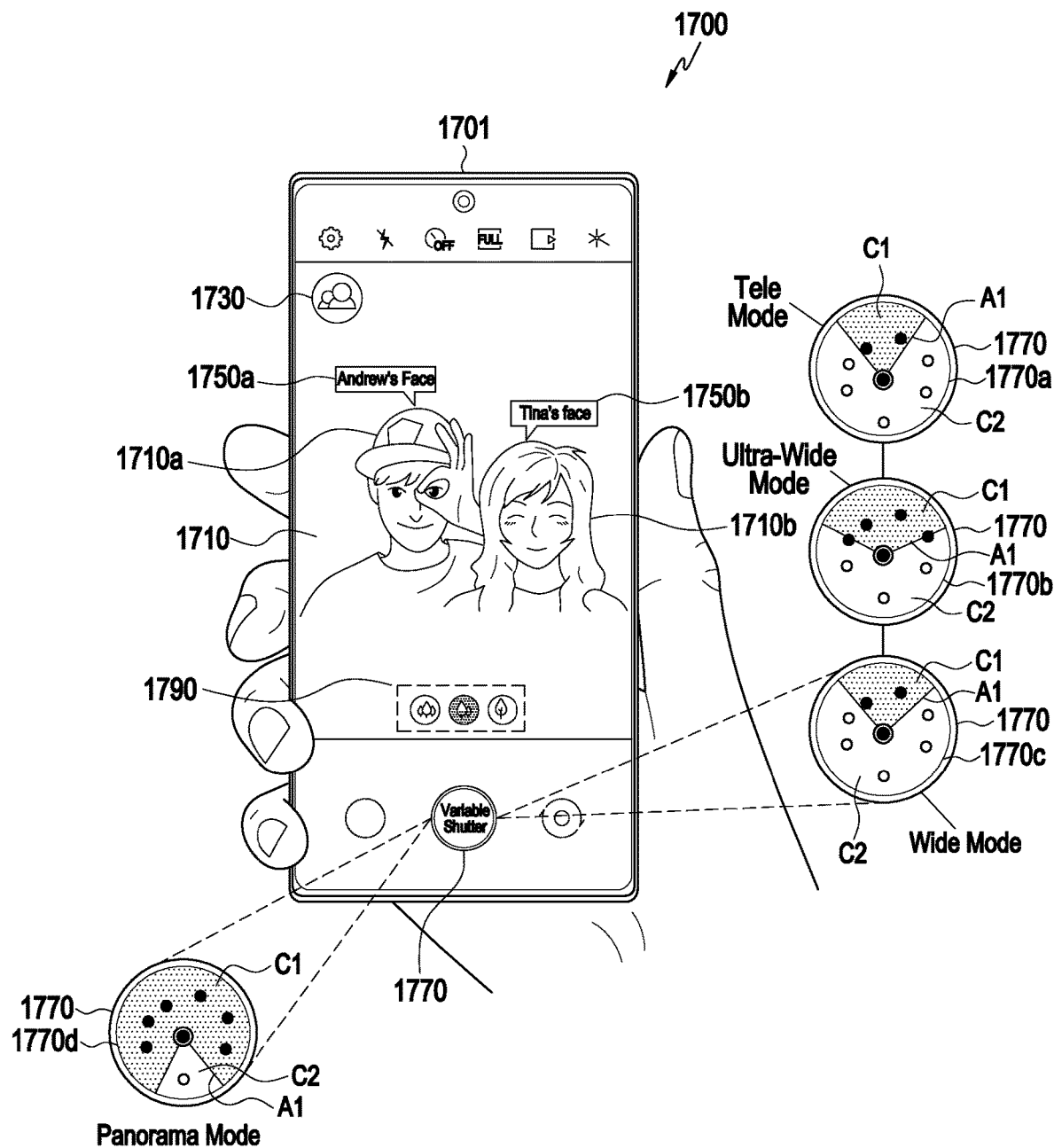
FIG. 17 is a diagram illustrating an image transmission operation in an electronic device, according to various embodiments.

According to an embodiment, an indicator including a plurality of location icons indicating each of a plurality of peripheral external electronic devices capable of transmitting and/or receiving UWB signals through the first communication module 291 is displayed on the third graphic object for transmitting a photographed image, the processor 220 may change the indicator and display the number of location icons (e.g., location icons corresponding to the shared external electronic device included in the sharing area c1 of FIG. 17) indicating the shared external electronic device and the location icons (e.g., location icons corresponding to the non-shared external electronic device included in the non-shared area c2 of FIG. 17) indicating the non-shared external electronic device, depending on the field of view range of the camera, which is changed to correspond to the type of the photographing mode of the camera. For example, when the photographing mode is an ultra-wide mode, the processor 220 may display an indicator that distinguishes between a location icon indicating a shared external electronic device and a location icon indicating a non-shared external electronic device on the third graphic object, based on an angle of view of about 120 degrees, for example. When the photographing mode is changed to the wide mode, the processor 220 may display an indicator that distinguishes between a location icon representing a shared external electronic device and a location icon representing a non-shared external electronic device on the third graphic object, based on an angle of view of about 80 degrees, for example. When the photographing mode is changed to the telephoto mode, the processor 220 may display an indicator that distinguishes between a location icon representing a shared external electronic device and a location icon representing a non-shared external electronic device on the third graphic object, based on an angle of view of about 30 degrees, for example.

According to various embodiments, the processor 220 may transmit/receive a UWB signal (e.g., a ranging message) through a plurality of vertically and/or horizontally aligned antennas used by the first communication module 291 according to a rotationally mounted state of the electronic device 201.

According to an embodiment, the processor 220 may form a virtual coordinate space based on the azimuth (or "yaw"), pitch and/or roll values measured by the 9-axis motion sensor, may divide one region of the coordinate space into a landscape (e.g., horizontal rotation mounted state) range, and may divide another region of the coordinate space into a portrait (e.g., vertical rotation mounted state) range. The processor 120 may detect whether the rotationally mounted state of the electronic device is a horizontal rotation mounted state or a vertical rotationally mounted state, based on whether the current state of the electronic device belongs to a landscape range or a portrait range. The horizontal rotation mounting state may indicate a mounted state in which a parallel long surface of the electronic device is rotated along a horizontal axis parallel to the ground, and the vertical rotation mounting state may indicate a mounted state in which a parallel long surface of the electronic device is rotated along a vertical axis perpendicular to the ground.

Figure 4:
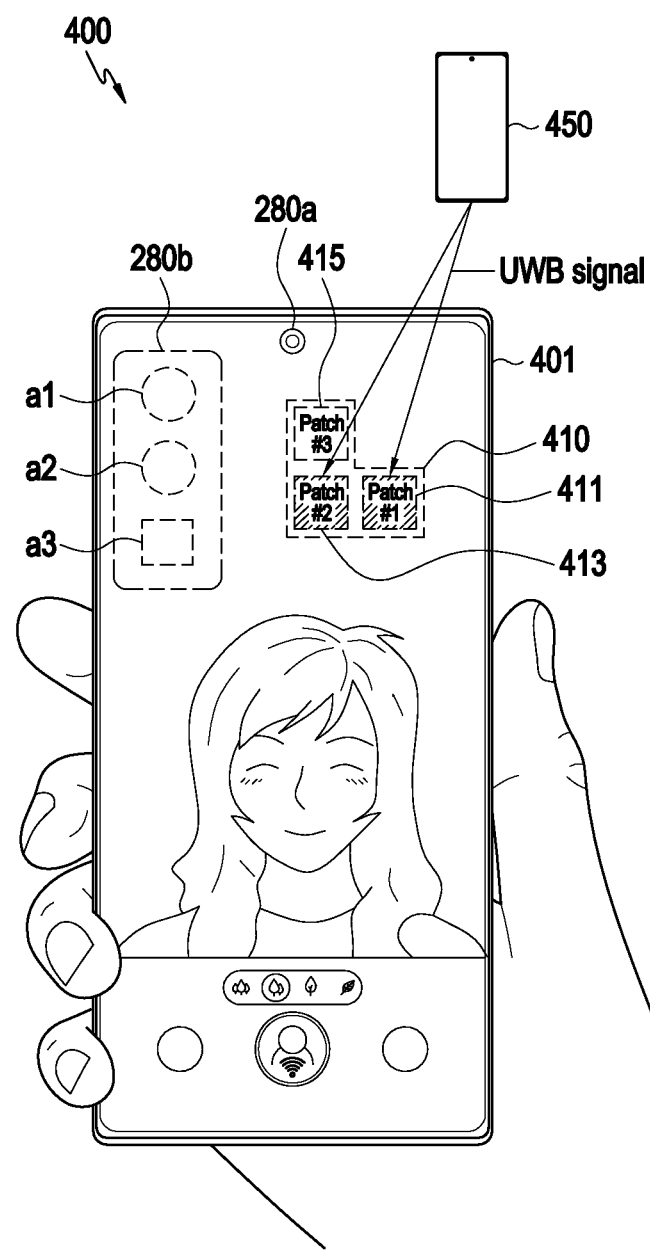
FIG. 4 is a diagram illustrating a plurality of antennas included in an electronic device, according to various embodiments.

According to an embodiment, the processor 220 may identify the rotationally mounted state of the electronic device, and when the rotationally mounted state of the electronic device is the vertical rotationally mounted state, may transmit/receive a UWB signal through at least two antennas (e.g., the first patch antenna 411 and/or the second patch antenna 413 of FIG. 4) aligned in a horizontal axis among a plurality of antennas used by the first communication module 291. When the rotationally mounted state of the electronic device is the horizontal rotationally mounted state, the processor 220 may transmit/receive a UWB signal through at least two antennas (e.g., the second patch antenna 413 and/or the third patch antenna 415 of FIG. 4) aligned in a vertical axis among a plurality of antennas used by the first communication module 291.

According to an embodiment, the plurality of antennas used by the first communication module 291 may include a plurality of patch elements.

According to various embodiments, the memory 230 may be implemented substantially the same as or similar to the memory 130 of FIG. 1.

According to an embodiment, the memory 230 may include a first area for storing an image obtained from the camera module 280 in a camera interface (e.g., a camera preview mode), and a second area for storing an image detected as a photographed image according to selection of a third graphic for transmitting the photographed image to the shared external electronic device among the images stored in the first area.

According to an embodiment, the memory 230 may include a buffer for temporarily storing the image acquired from the camera module 280 in a camera interface (e.g., camera preview mode), and a second area for storing an image photographed according to selection of a third graphic to be transmitted to a shared external electronic device.

According to various embodiments, the display 260 may be implemented substantially the same as or similar to the display module 160 of FIG. 1.

According to an embodiment, the display 260 may display the image acquired from the camera module 280 and provide a camera interface including a graphic object capable of transmitting the photographed image to a shared external electronic device.

According to an embodiment, the display 260 may provide a camera interface including a first graphic object providing analysis information of an image acquired from the camera module 280, a second graphic object for providing identification information on the subject included in the image, a third graphic object for transmitting a photographed image including the subject to a shared external electronic device related to the subject.

According to various embodiments, the sensor module 276 may be implemented substantially the same as or similar to the sensor module 176 of FIG. 1.

According to an embodiment, the sensor module 276 may provide raw data for determining the magnetic north direction and a photographing direction of the electronic device to the processor 220.

According to an embodiment, the sensor module 276 may represent a 9-axis motion sensor, which may include, for example, an acceleration sensor, a gyro sensor, or a geomagnetic sensor, and the acceleration sensor, the gyro sensor, and the geomagnetic sensor may be configured as a three-axis sensor.

According to various embodiments, the camera module 280 may be implemented substantially the same as or similar to the camera module 180 of FIG. 1, and may include at least one camera located at the front and at least one camera located at the rear.

According to various embodiments, the communication module 290 may be implemented substantially the same as or similar to the communication module 190 of FIG. 1, and may include a plurality of communication circuits using different communication technologies, including the communication module 290.

According to an embodiment, the communication module 290 may include a first communication module 291, a second communication module 293, a third communication module 295, and/or a fourth communication module 297.

According to an embodiment, the first communication module 291 may include an UWB communication module capable of transmitting and/or receiving UWB signals to and/or from an external electronic device using a plurality of antennas for UWB communication.

According to an embodiment, the second communication module 293 may include at least one of a wireless LAN module (not shown) and a short-range communication module (not shown), and may include a near-field communication (NFC) module, a Bluetooth legacy communication module, and/or a BLE communication module as the short-range communication module (not shown).

According to an embodiment, the third communication module 295 may include a global navigation satellite system (GNSS) communication module.

According to an embodiment, the fourth communication module 297 may include a telecommunication network such as a legacy cellular network, a 5G network, a next-generation communication network, the Internet, or a computer network (e.g., LAN or WAN).

Figure 3:
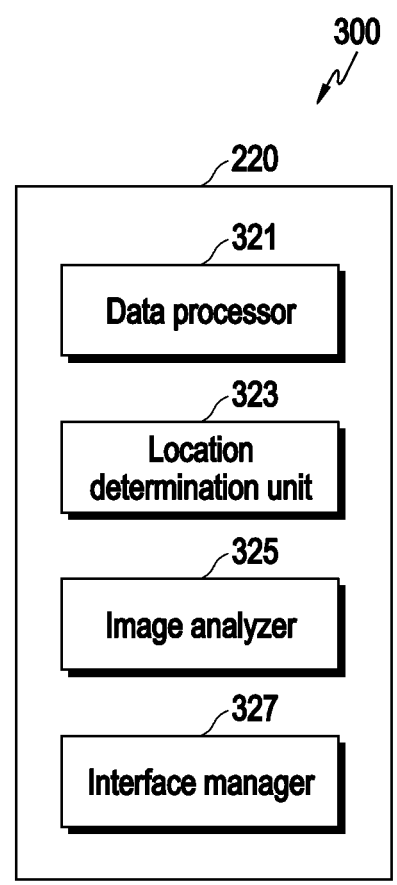
FIG. 3 is a block diagram of a processor of an electronic device, according to various embodiments.

FIG. 3 is a block diagram 300 of a processor of an electronic device according to various embodiments.

Referring to FIG. 3, the processor (e.g., the processor 120 of FIG. 1, the processor 220 of FIG. 2) may include a data processor 321, a location determination unit 323, an image analyzer 325 and/or an interface manager 327.

According to various embodiments, when a third graphic object for transmitting the photographed image to the shared external electronic device is selected from the camera interface, the data processor 321 may generate the photographed image as data for transmission according to a specified transmission method and/or transmission quality (e.g., HD/FHD/UHD/4K/8K), and may control to transmit the generated data to the shared external electronic device using at least one communication module among the second communication module (e.g., the second communication module 293 of FIG. 2) to the fourth communication module (e.g., the communication module 297 of FIG. 4).

According to various embodiments, the location determination unit 323 may determine a relative position between the electronic device and the external electronic device through photographing direction information of the electronic device detected based on the sensor information received from the sensor module (e.g., the sensor module 276 of FIG. 2) and location information (e.g., distance information and/or direction information) of an external electronic device detected based on the UWB signal transmitted and received from the first communication module (e.g., the first communication module 291 of FIG. 2). The location determination unit 323 may determine a first azimuth angle according to the photographing direction information of the electronic device based on the sensor information received from the sensor module, may determine a second azimuth angle according to the direction information of the external electronic device based on a plurality of duplicate signals received from the external electronic device through the first communication module, and when the first azimuth angle and the second azimuth angle are included in the range of the angle of view of the camera, may determine a shared external electronic device related to a subject located in the photographing direction information of the electronic device. The location determination unit 323 may receive satellite location information from a global navigation satellite system (GNSS) module that is a third communication module 295 to further determine a third azimuth angle including the moving direction of the electronic device to improve accuracy of location information of the external electronic device.

According to various embodiments, the image analyzer 325 may generate a first graphic object (e.g., a scene message) providing analysis information of an image obtained from a camera module (e.g., the camera module 280 of FIG. 2) and provides the same to the camera interface.

According to various embodiments, the interface manager 327 may provide a camera interface including a third graphic for displaying various indicators, based on analysis information of the image acquired from the camera module (e.g., the camera module 280 of FIG. 2), photographing direction information of the electronic device detected based on the sensor information received from the sensor module (e.g., the sensor module 276 of FIG. 2), and/or location information (e.g., distance information and direction information) of the shared external electronic device detected based on the UWB signal transmitted and received from the first communication module (e.g., the first communication module 291 of FIG. 2).

FIG. 4 is a diagram 400 illustrating a plurality of antennas included in an electronic device according to various embodiments.

Referring to FIG. 4, according to various embodiments, the electronic device 401 may have a camera module including a front camera 280a and a rear camera 280b, and the rear camera 280b may include an ultra-wide-angle camera a1, an oblivion camera a2, and/or a telephoto camera a3. The electronic device 401 may include a UWB antenna 410 for a UWB communication module (e.g., the first communication module 291 of FIG. 2). The UWB antenna 410 may include a first patch element 411, a second patch element 413, and/or a third patch element 415 which are a plurality of patch elements as the plurality of antennas.

According to various embodiments, the electronic device 401 may measure the distance information (e.g., ranging information) and the direction information (e.g., AOA information) about the external electronic device 450 using the UWB signal transmitted and/or received to and/or from the external electronic device 450 through the plurality of patch elements 411 to 415.

According to various embodiments, the electronic device 401 may transmit/receive a UWB signal through at least two patch elements among the plurality of patch elements 411 to 415 according to a rotationally mounted state of the electronic device.

According to an embodiment, when the rotationally mounted state of the electronic device is determined to be the vertical rotationally mounted state of the electronic device 401, the electronic device 401 may transmit/receive a UWB signal to and/or from the external electronic device 450 using the first patch element 411 and the second patch element 413 aligned in a horizontal axis among the plurality of patch elements 411 to 415.

According to an embodiment, when the rotationally mounted state of the electronic device is determined to be the horizontal rotationally mounted state, the electronic device 401 may transmit/receive a UWB signal to and/or from the external electronic device 450 using the second patch element 413 and the third patch element 415 aligned along a vertical axis among the plurality of patch elements 411 to 415. According to another embodiment, when measuring 3D direction information (e.g., 3D AOA) for an external electronic device, the electronic device 401 may receive a response signal by activating all of the first patch element 411 to the third patch element 415, regardless of the rotationally mounted state of the electronic device. The electronic device 401 measures left/right directions (and/or up/down directions) using data received through the first patch element 411 and/or the second patch element 413, and may measure up/down directions (and/or left/right directions) using data received through the second patch element 413 and/or the third patch element 415.

Although the UWB antenna is described as an example in FIG. 4 as a patch element, it is not limited to a patch element, distance information and direction information of an external electronic device may be determined by receiving a UWB signal through a plurality of aligned housing frame antennas and/or by using a patch element and a UWB signal received through a housing frame antenna spaced a predetermined distance from the patch element.

The electronic device 401 shown in FIG. 4 has a bar type or plate type external appearance, but the present disclosure is not limited thereto. For example, the illustrated electronic device may be a rollable electronic device and/or a part of a foldable electronic device. The term "rollable electronic device" may refer to an electronic device of which display (e.g., the display 260 of FIG. 2) may be bent and/or deformed, so that at least a part thereof may be wound and/or rolled up or accommodated in a housing (not shown). According to a user's needs, the rollable electronic device may be used by expanding the screen display area by unfolding the display and/or exposing a larger area of the display to the outside. A "foldable electronic device" may refer to an electronic device that is foldable in a direction to face two different regions of a display or to face each other in opposite directions. In general, in a portable state of the foldable electronic device, the display may be folded with two different areas facing each other or in opposite directions, and in actual use, the user may unfold the display so that the two different areas form a substantially flat plate shape. In some embodiments, the electronic device 401 may be interpreted to include not only a portable electronic device such as a smartphone, but also various other electronic devices such as a notebook computer or home appliance.

Figure 5A:
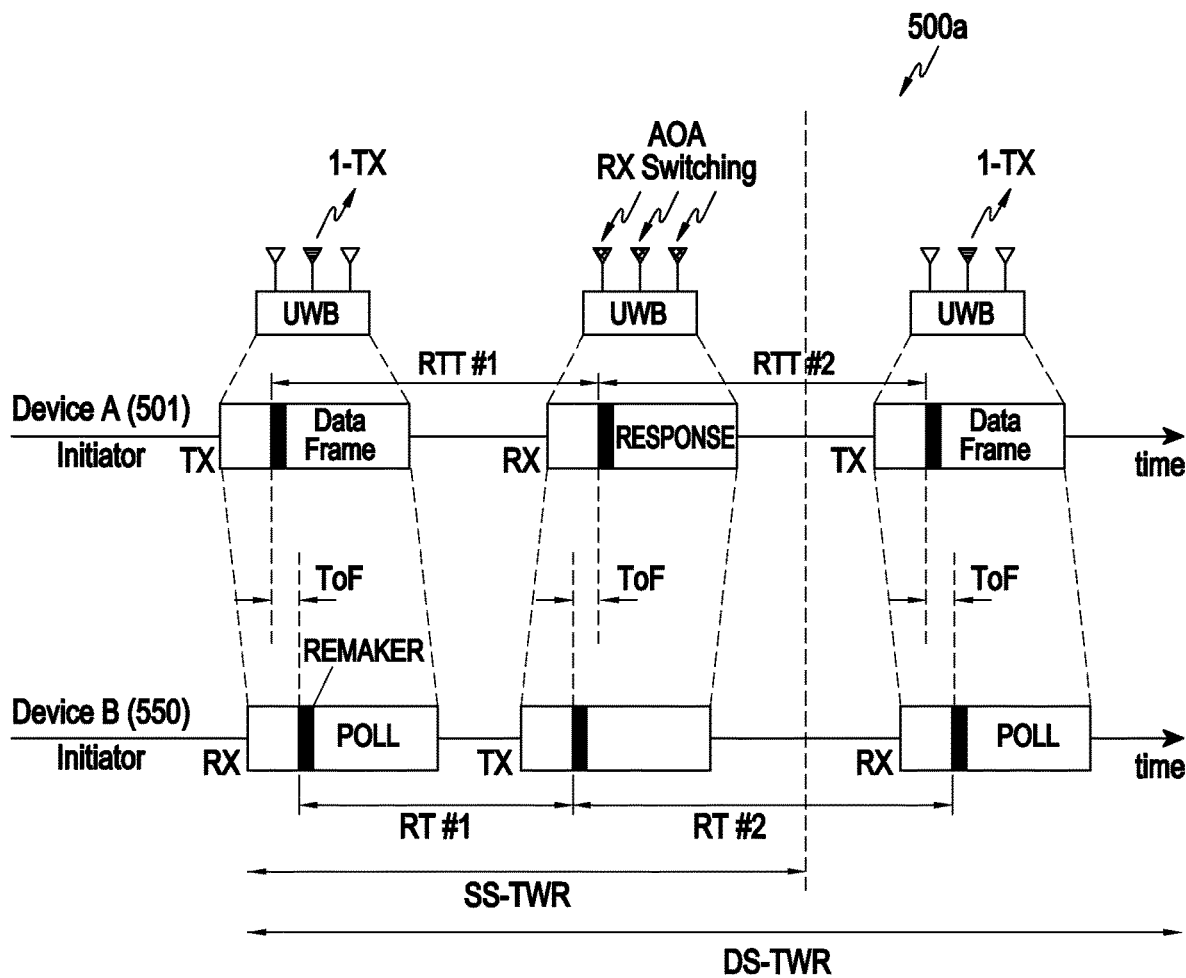
FIGS. 5A and 5B are diagrams illustrating an operation of determining location information of an external electronic device in an electronic device, according to various embodiments.
Figure 5B:
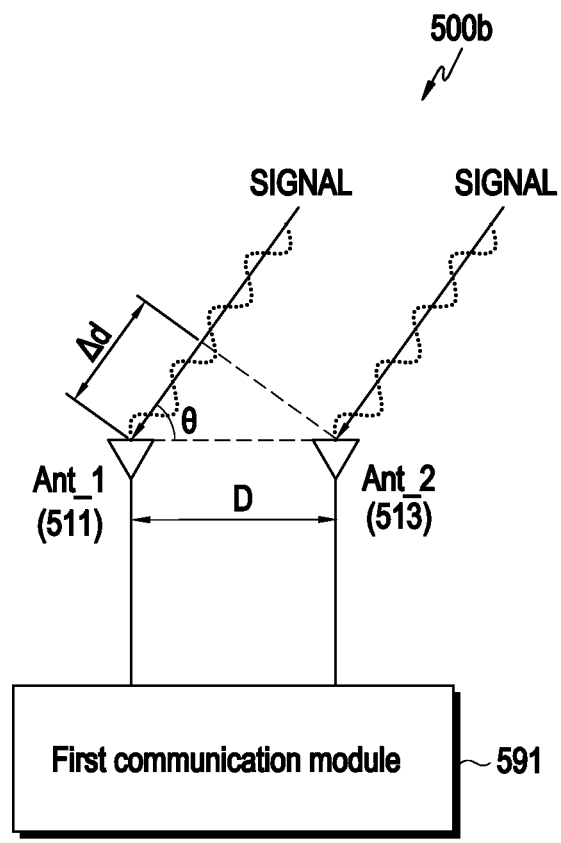

FIGS. 5A and 5B are diagrams 500a and 500b illustrating an operation of determining location information of an external electronic device in an electronic device according to various embodiments of the present disclosure.

According to an embodiment, the electronic device (e.g., the electronic device 101 of FIG. 1, the electronic device 201 of FIG. 2, or the electronic device 401 of FIG. 4) may determine distance information (e.g., ranging information) and direction information (e.g., AOA information) of an external electronic device while transmitting and/or receiving a UWB signal with the external electronic device 450 of FIG. 4) through a plurality of antennas (e.g., a plurality of elements 411 to 415 of FIG. 4) used by the first communication module (e.g., the first communication module 291 of FIG. 2). The electronic device may transmit and/or receive the UWB signal to and/or from the external electronic device. That is, the electronic device may transmit a poll message to the external electronic device and receive a response message (e.g., a ranging response message) corresponding to the poll message (e.g., a ranging request message). The electronic device may determine distance information (e.g., ranging information) for the external electronic device, based on a difference in transmission/reception time between the poll message and the response message. The operation of determining the distance information (e.g., ranging information) may be referred to as two way ranging (TWR), and the TWR operation may be divided into single sided two way ranging (SS-TWR) and double sided two way ranging (DS-TWR).

According to an embodiment, the electronic device may perform a distance information measurement operation using the two way ranging (TWR) method between external electronic devices capable of UWB communication in which clocks are not synchronized. The electronic device may perform the distance information measurement operation through the single sided-two way ranging (SS-TWR) method and the double sided-two way ranging (DS-TWR) method.

Referring to FIG. 5A, according to an embodiment, in the SS-TWR method, the electronic device 501 may transmit a ranging request message (or a poll message) using a second patch element (e.g., the second patch element 413 of FIG. 4), and may receive a ranging response message (or a response message) from the external electronic device 550 using a first patch element (e.g., the first patch element 411 of FIG. 4) and second patch element (e.g., the second patch element 413 of FIG. 4) or the second patch element (e.g., the second patch element 413 of FIG. 4) and a third patch element (e.g., the third patch element 415 of FIG. 4). The ranging response message may include a first response time (RT #1 (reply time)). The first response time RT #1 may be a time taken for the external electronic device 550 to receive the ranging request message and transmit the ranging response message. The electronic device 501 may measure a first round-trip time (RTT #1) required to transmit the ranging request message and receive the ranging response message, and may measure the distance to the external electronic device 550, based on time of flight (ToF) by subtracting the first response time RT #1 from the first round trip time. The electronic device 501 may measure AOA with the external electronic device 550, based on a difference in arrival distance of a response message received to the first patch element (e.g., the first patch element 411 of FIG. 4) and/or the second patch element (e.g., the second patch element 413 of FIG. 4) and/or the distance from the external electronic device 550. Alternatively or additionally, the first electronic device 501 may measure AOA with an external electronic device, based on the difference in the arrival distance of the response message received to the second patch element (e.g., the second patch element 413 of FIG. 4) and/or the third patch element (e.g., the third patch element 415 of FIG. 4) and/or the distance from the external electronic device 550. The electronic device 501 may transmit a ranging request message (or poll message) to the external electronic device 550 during a transmit (TX) period through a receive (RX) and/or TX antenna among a plurality of antennas for UWB communication.

In some embodiments, the electronic device 501 may determine the ToF by using a time difference between Rmarkers (ranging markers) included in the UWB data frame of the transmitted/received message. The method of predicting a location using the time difference as described above is called a time of arrival (TOA) method or a time difference of arrival (TDOA) method. The double sided-two way ranging (DS-TWR) method is a method in which the SS-TWR scheme is repeatedly performed twice.

According to an embodiment, in a process of receiving a response message from the external electronic device in response to the poll message transmitted to the external electronic device, the electronic device may determine AOA information that is direction information for the external electronic device. When the electronic device includes one antenna for UWB communication, the electronic device may measure only distance information from the external electronic device. When the electronic device includes a plurality of antennas for UWB communication, the electronic device may measure distance information and direction information (e.g., AOA information) with respect to the external electronic device.

Referring to FIG. 5B, the electronic device may store length D information between the plurality of antennas 511 and 513 for UWB communication in a memory (e.g., the memory 230 of FIG. 2), and may calculate a difference in arrival distance $\Delta d$ from an external electronic device performing UWB communication using a difference in reception time for the same signal received through the plurality of antennas 511 and 513 for UWB communication. The arrival distance difference $\Delta d$ may be determined as a function of the phase difference $\Delta \varphi$ of signals received from a plurality of antennas for UWB communication, and the electronic device may determine an angle of arrival (AOA) $\theta$, which indicates direction information of an external electronic device performing UWB communication, based on Equation 1, Equation 2, and Equation 3.

$$D = \Delta d \times \cos\theta \quad [\text{Eq. 1}]$$

$$\Delta \varphi = \frac{2\pi}{\lambda} \times \Delta d \quad [\text{Eq. 2}]$$

$$AOA(\theta) = \cos^{-1}\frac{\Delta \varphi}{2\pi D/\lambda} \quad [\text{Eq. 3}]$$

Referring to Eq. 1, D denotes the length between a plurality of antennas, and $\Delta d$ denotes difference in arrival distance of the same UWB received from an external electronic device.

Figure 6A:
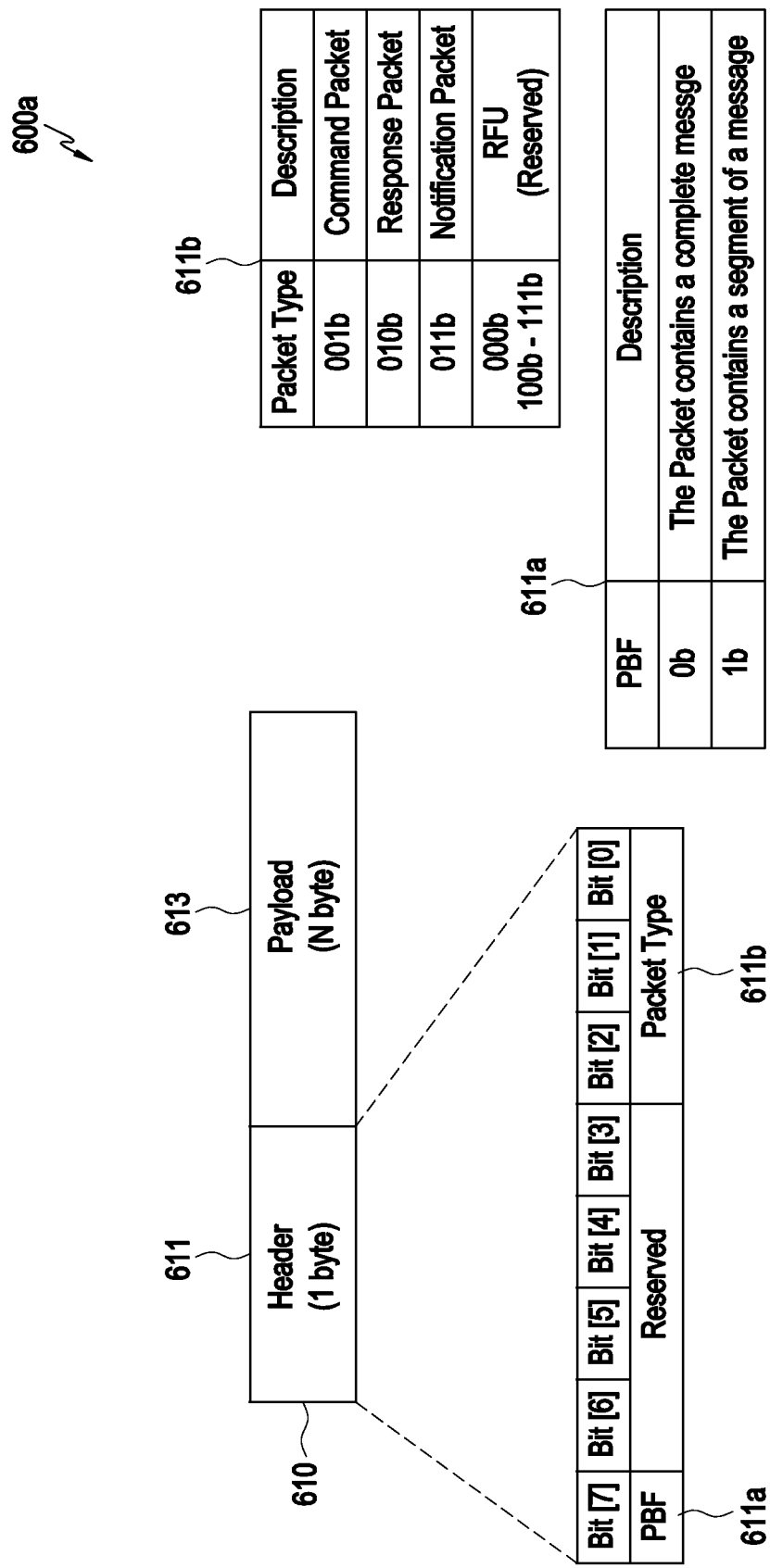
FIGS. 6A and 6B are diagrams illustrating a configuration of a message received from an external electronic device in an electronic device, according to various embodiments.
Figure 6B:
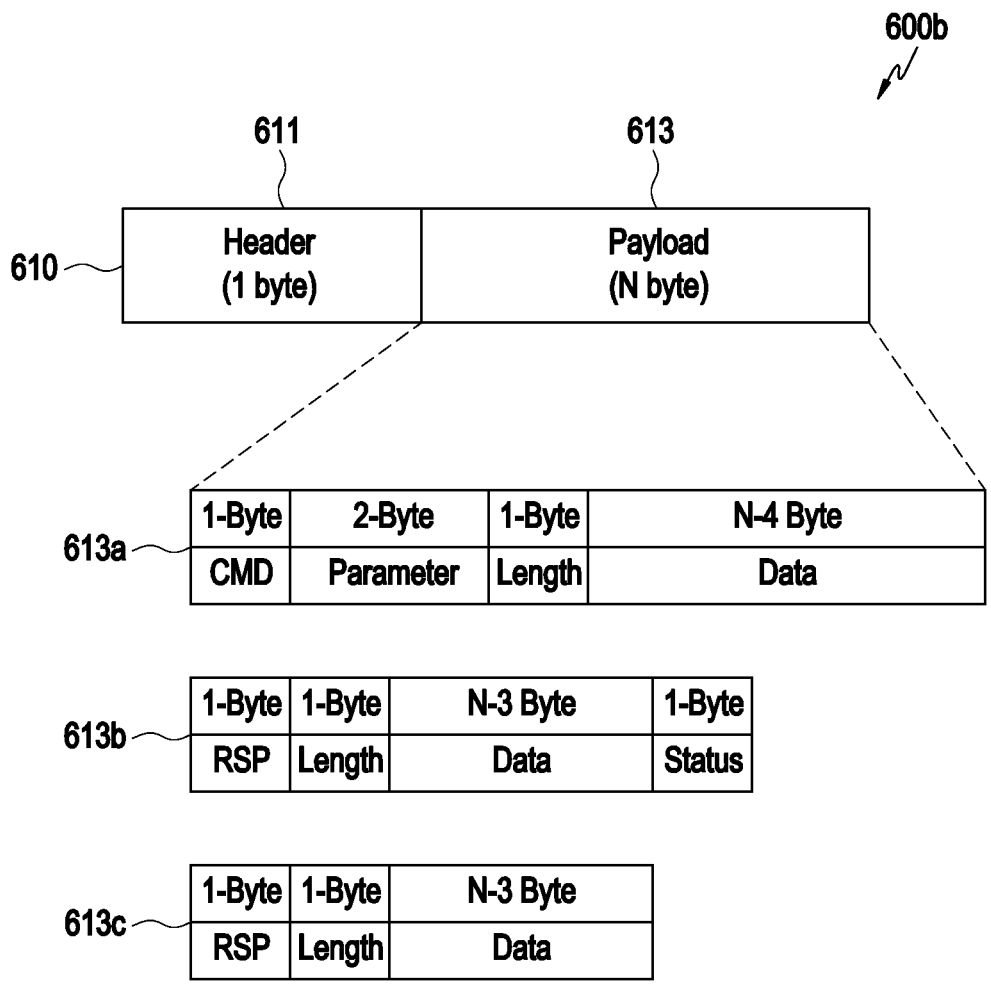

FIGS. 6A and 6B are diagrams 600a and 600b illustrating a configuration of a message received from an external electronic device in an electronic device according to various embodiments.

The electronic device (e.g., the electronic device 101 of FIG. 1, the electronic device 201 of FIG. 2, or the electronic device 401 of FIG. 4) may receive a ranging response message (response message) including a data packet in response to a ranging request message (e.g. poll message) transmitted to an external electronic device performing UWB communication.

Referring to FIG. 6A and FIG. 6B, the ranging message 610 may include a header 611 and a payload 613. As shown in FIG. 6A, the header 611 may consist of 8 bits, 1 bit may be allocated to PBF, which is message type information 611a, 4 bits may be allocated to the reserved field, and 3 bits may be allocated to indicate the type information 611b of the data packet. The PBF may indicate whether the packet contains the entire message or a part of the message. The packet type information may include a command packet, a response packet, and/or a notification packet. FIG. 6B shows an exemplary structure of the payload of the ranging response message, as in FIG. 6B, the payload of the ranging response message may consist of N bytes, and may have a first structure 613a in which N−4 bytes are allocated to data, a second structure 613b in which N−3 bytes are allocated to data, or a third structure 613c in which N−2 bytes are allocated to data. The area of the payload 613 may include device user information, device status information, and/or whether a privacy mode is used.

Figure 7:
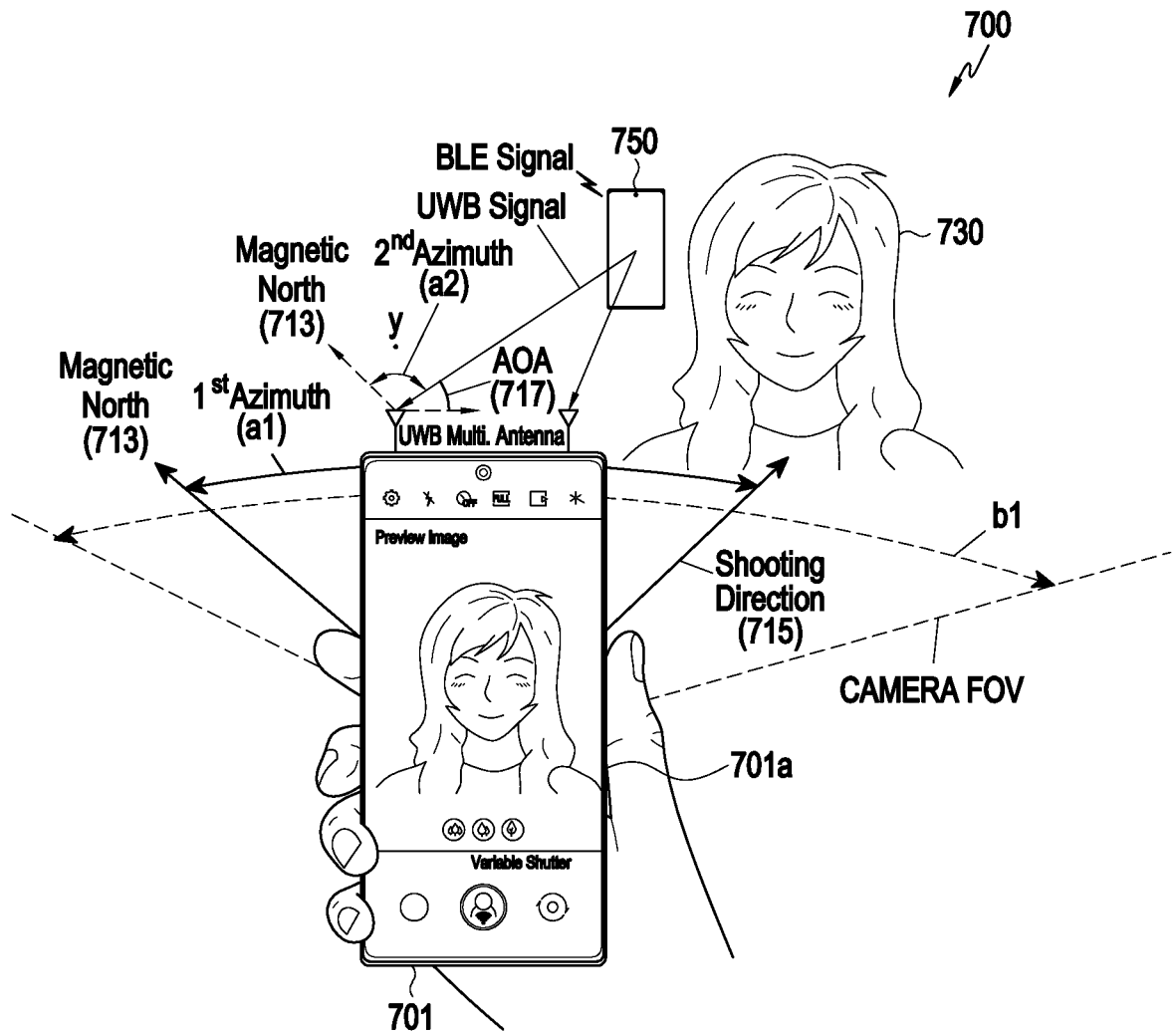
FIG. 7 is a diagram illustrating an operation of determining a shared external electronic device in an electronic device, according to various embodiments.

FIG. 7 is a diagram 700 illustrating an operation of determining a shared external electronic device in an electronic device according to various embodiments.

Referring to FIG. 7, according to various embodiments, when the camera interface (e.g., camera preview mode) 701a is activated, in a case in which the electronic device 701 faces the subject 730 by the user, the electronic device 701 (e.g., the electronic device 201 of FIG. 2 or the electronic device 401 of FIG. 4) may determine a first azimuth angle a1 including a photographing direction 715 of the electronic device 701 that is a relative orientation from the magnetic north direction 713, which may be referred to as an absolute orientation, based on the raw data received from the sensor module (e.g., the sensor module 276 of FIG. 2). When the camera interface is activated, the electronic device 701 may determine UWB communication compatibility information from first information (e.g., a BLE packet message included in a BLE signal) received from the external electronic device 750 through a second communication module (e.g., the communication module 293 of FIG. 2), and may activate a first communication module for UWB communication (e.g., the first communication module 291 of FIG. 2) based on the UWB communication compatibility information. The electronic device 701 may determine direction information (e.g., angle of arrival (AOA)) of the external electronic device using the ranging response signal (UWB signal) received from the external electronic device 750 through the first communication module. The electronic device 701 may determine the second azimuth angle a2, based on the difference in azimuth between the magnetic north direction 713, which may be referred to as an absolute direction, obtainable through the sensor module and the direction information (e.g., angle of arrival (AOA)) 717 of the external electronic device which is a relative direction. The electronic device 701 may determine the range of view angle b1 of the camera corresponding to the currently active photographing mode among multiple photographing modes (e.g., ultra-wide mode, wide mode, telephoto mode, panorama mode, single take mode, and/or vide mode) according to activation of the camera interface. When the first azimuth angle a1 and the second azimuth angle a2 are included in the angle of view range b1 of the camera, the electronic device may determine the external electronic device 750 as an external electronic device related to the subject 730 as a shared external electronic device. According to an embodiment, when determining the shared external electronic device, the electronic device may further include a third azimuth angle including the moving direction of the electronic device. When the first azimuth angle a1, the second azimuth angle a2, and/or the third azimuth angle (not shown) are included in the field of view range b1 of the camera, the electronic device may determine the external electronic device 750 as an external electronic device related to the subject 730 as a shared external electronic device.

Figure 8:
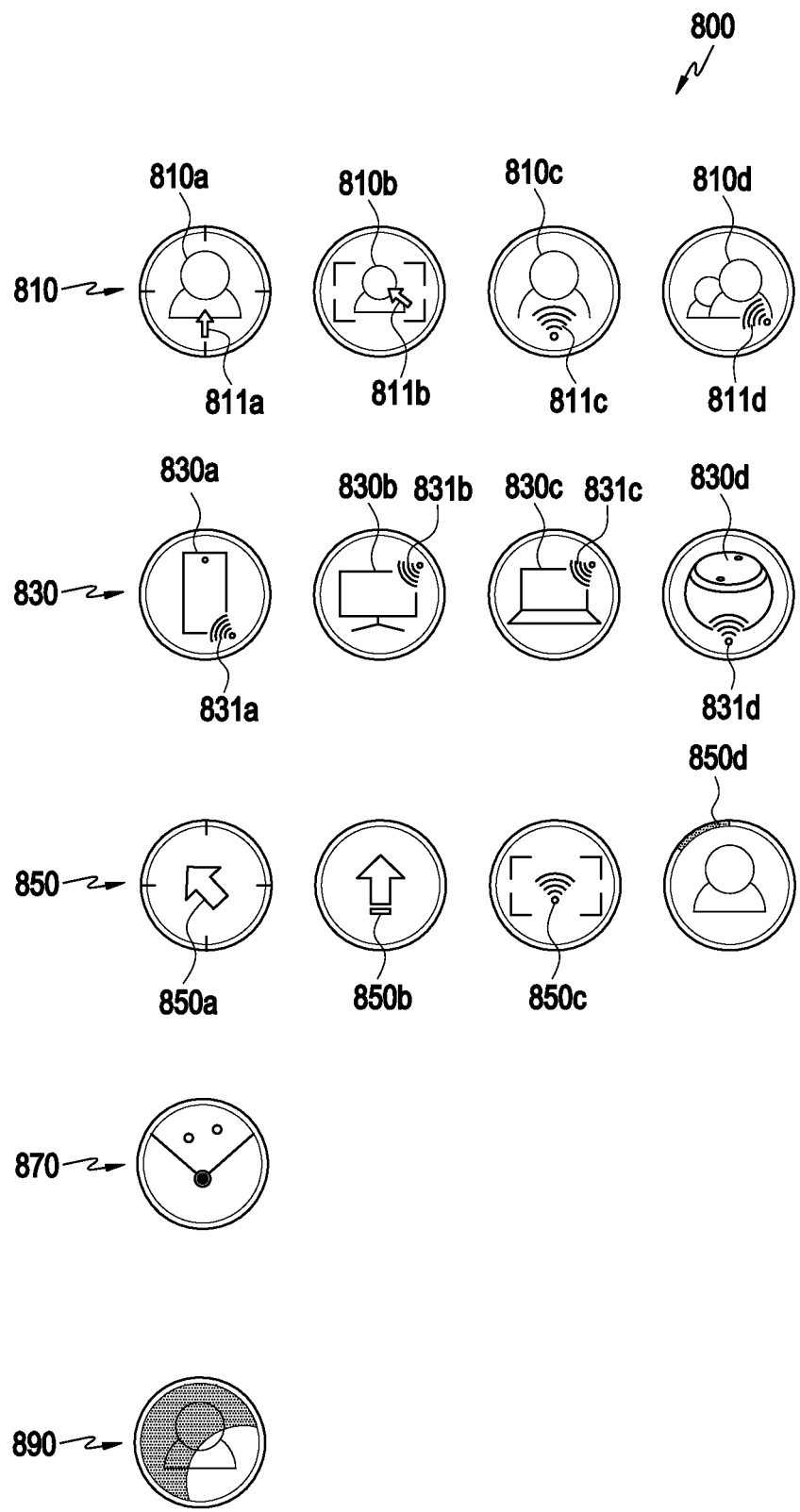
FIG. 8 is a diagram illustrating a graphic object for transmitting a photographed image provided from a camera interface of an electronic device, according to various embodiments.

FIG. 8 is a diagram 800 illustrating a graphic object for transmitting a photographed image provided from a camera interface of an electronic device according to various embodiments.

Referring to FIG. 8, according to various embodiments, the electronic device (e.g., the electronic device 101 of FIG. 1, the electronic device 201 of FIG. 2, the electronic device 401 of FIG. 4, or the electronic device 701 of FIG. 7) may display one of various indicators 810 indicating the type of the subjects (e.g., persons) 810a to 810d and the directions 811a to 811d of the shared external electronic device, based on analysis information of the image obtained from the camera module (e.g., the camera module 280 of FIG. 2) and/or location information (e.g., distance information and/or direction information) of the shared external electronic device determined using the first communication module (e.g., the first communication module 291 of FIG. 2).

According to various embodiments, the electronic device may display one of various indicators 810 indicating the type of the subjects (e.g., a person) 810a to 810d and the directions 811a to 811d of the shared external electronic device, based on analysis information of the image acquired from the camera module (e.g., the camera module 280 in FIG. 2) to the graphic object (e.g., the third graphic object) for transmitting the photographed image from the camera interface, location information (e.g., distance information and/or direction information) of the shared external electronic device determined using the first communication module (e.g., the first communication module 291 of FIG. 2), and/or identification information of the shared external electronic device included in the first information (e.g., BLE packet message) received through the second communication module (e.g., the second communication module 293 of FIG. 2).

According to various embodiments, the electronic device may display one of various indicators 850 indicating the directions 850a to 850d of the shared external electronic device on a graphic object (e.g., a third graphic object) for transmitting a photographed image in the camera interface, based on the location information (e.g., distance information and/or direction information) of the shared external electronic device determined using the first communication module (e.g., the first communication module 291 of FIG. 2). The electronic device may provide the indicators 850 including arrows 850a to 850b indicating the directions of the shared external electronic device, or an indicator 850 including a reception strength 850c indicating the direction of the shared external electronic device. In addition, the electronic device may provide an indicator that brightly (e.g., at a high brightness level) displays a portion 850d corresponding to the direction of the shared external electronic device among a predetermined area (e.g., an outer peripheral area) of a graphic object for transmitting the photographed image, and/or an indicator 850 that displays the portion 850d corresponding to the direction of the shared external electronic device in a distinct color. According to various embodiments, the electronic device may display an indicator 870 indicating a location icon indicating a shared external electronic device included in the field of view range of the camera on a graphic object (e.g., a third graphic object) for transmitting a photographed image in the camera interface.

According to various embodiments, the electronic device may display an indicator 890 indicating notification information (e.g., transmission time and/or transmission speed) related to transmission of the photographed image on the graphic object for transmitting the photographed image when automatically transmitting a photographed image to a shared external electronic device in response to a selection of a graphic object (e.g., a third graphic object) for transmitting a photographed image in the camera interface.

According to various embodiments, the electronic device may include a first communication module (e.g., the first communication module 291 of FIG. 2), a second communication module (e.g., the second communication module 293 of FIG. 2), a sensor module (e.g., the sensor module 276 of FIG. 2), a camera module (e.g., the camera module 280 of FIG. 2), and a processor (e.g., the processor 220 of FIG. 2), and the processor may be configured to, when a camera interface is activated, determine a shared electronic device, based on the photographing direction information of the electronic device determined based on the sensor information received from the sensor module, the direction information of the external electronic device determined based on a first signal (e.g., a ranging response signal) received through the first communication module, and information on the angle of view of the camera, and transmit the photographed image to the determined external electronic device when the graphic object provided by the camera interface is selected.

According to various embodiments, the processor may be configured to determine a first azimuth angle according to the photographing direction information of the electronic device based on the sensor information received from the sensor module, determine a second azimuth angle according to the direction information of the external electronic device, based on a first signal (e.g., a ranging response signal) received from the external electronic device through a plurality of antennas used by the first communication module, and determine the external electronic device as a shared external electronic device when the first azimuth angle and the second azimuth angle are included in a range of an angle of view of the camera.

According to various embodiments, the processor may be configured to determine the second azimuth angle, based on angle of arrival (AOA) information calculated using the first signal received through the first communication module.

According to various embodiments, the processor may be configured to identify a rotationally mounted state of the electronic device, transmit and/or receive the first signal through at least two antennas aligned in a horizontal axis among a plurality of antennas used by the first communication module when the rotationally mounted state of the electronic device is the vertical rotationally mounted state, and transmit/receive the first signal through at least two antennas aligned in a vertical axis among a plurality of antennas used by the first communication module when the rotationally mounted state of the electronic device is the horizontal rotationally mounted state.

According to various embodiments, the processor may be configured to activate the first communication module, based on first information received from the external electronic device through the second communication module.

According to various embodiments, the processor may be configured to provide a first graphic object that provides analysis information of the image acquired from the camera module in the camera interface, a second graphic object providing identification information on a subject included in the image, and a third graphic object for transmitting a photographed image to the shared external electronic device.

According to various embodiments, the processor may be configured to display different indicators on the third graphic object, based on at least one of the analysis information of the image acquired from the camera module, the location information of the shared external electronic device, and the identification information of the external electronic device received through the second communication module.

According to various embodiments, the processor may be configured to display a fourth graphic object for selecting a shared external electronic device for image transmission among the plurality of shared external electronic devices on the camera interface when the plurality of shared external electronic devices are determined.

According to various embodiments, the processor may be configured to display information on a first shared external electronic device among the plurality of shared external electronic devices on the third graphic object as an indicator when the plurality of shared external electronic devices are determined, transmit the photographed image to the first shared external electronic device when the third graphic object is selected, display information on a second shared external electronic device among the plurality of shared external electronic devices on the third graphic object as an indicator when transmitting the photographed image to the first shared external electronic device, and transmit the photographed image to the second shared external electronic device when the third graphic object is selected.

According to various embodiments, the processor is configured to display an indicator that distinguishes a plurality of external electronic devices capable of communicating through the first communication module into a shared external electronic device and a non-shared external electronic device depending on the angle of view range corresponding to the photographing mode of the camera on the third graphic object.

Figure 9:
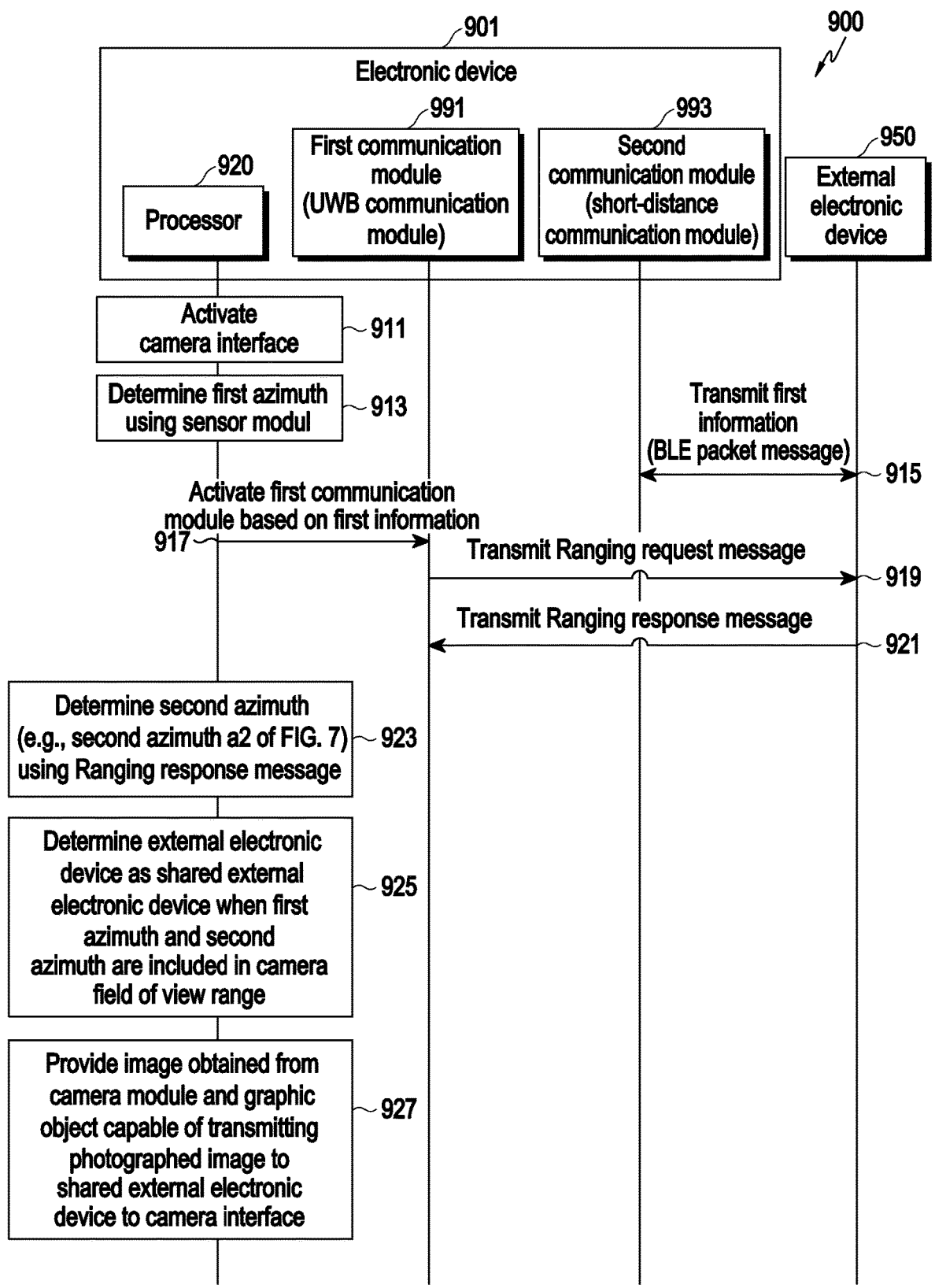
FIG. 9 is a flowchart illustrating an image transmission operation in an electronic device, according to various embodiments.

FIG. 9 is a flowchart 900 illustrating an image transmission operation in an electronic device according to various embodiments. In the following embodiment, each operation may be sequentially performed, but is not necessarily performed sequentially. For example, the order of each operation may be changed, and at least two operations may be performed in parallel.

Referring to FIG. 9, in operation 911, a processor 920 (e.g., the processor 220 of FIG. 2) may activate the camera interface according to a user's request.

According to an embodiment, the processor 920 may display an image acquired from a camera module (e.g., the camera module 280 of FIG. 2) on the camera interface when the camera interface is activated.

In operation 913, the processor 920 may determine a first azimuth angle (e.g., the first azimuth angle a1 of FIG. 7) using a sensor module (e.g., the sensor module 276 of FIG. 2).

According to an embodiment, the first azimuth angle including a photographing direction of the electronic device 901 as a relative direction from the magnetic north direction as an absolute direction, may be determined, based on the raw data received from the sensor module.

In operation 915, the processor 920 may transmit an advertising message to the external electronic device 950 through the second communication module 993 (e.g., the second communication module 293 of FIG. 2), and receive first information (e.g., a BLE packet message) from an external electronic device 950.

In operation 917, the processor 920 may activate a first communication module 991 (e.g., the first communication module 291 of FIG. 2), based on the first information received from an external electronic device 950.

According to an embodiment, the processor 920 may detect UWB communication compatibility information from the first information received from the external electronic device 950.

In operation 919, the processor 920 may transmit a ranging request message to the external electronic device 950 through the activated first communication module 991 (e.g., the first communication module 291 of FIG. 2).

In operation 921, the processor 920 may receive a ranging response message from the external electronic device 950 through the activated first communication module 991 (e.g., the first communication module 291 of FIG. 2).

In operation 923, the processor 920 may determine the second azimuth angle (e.g., the second azimuth angle a2 of FIG. 7) using the ranging response message received from the external electronic device 950.

According to an embodiment, the processor 920 may determine direction information (e.g., angle of arrival (AOA)) in which the external electronic device 950 is located from the electronic device 901 using the reception time difference between the same signals (ranging response message) received from a plurality of antennas for UWB communication used by the first communication module 991. The processor 920 may determine the second azimuth angle, based on the difference in the azimuth between the magnetic north direction, which may be referred to as an absolute orientation, and the direction information (e.g., angle of arrival (AOA)) of the external electronic device, which is a relative direction, which may be obtained through the sensor module.

In operation 925, the processor 920 may determine the external electronic device 950 as the shared external electronic device when the first azimuth angle and the second azimuth angle are included in the camera field of view range (e.g., the field of view range b1 of the camera of FIG. 7).

According to an embodiment, when the first azimuth angle and the second azimuth angle are included in the camera field of view range (e.g., the field of view range b1 of the camera of FIG. 7) corresponding to the currently activated photographing mode, the processor 920 may determine the external electronic device 950 as a shared external electronic device related to a subject included in an image obtained from a camera module (e.g., the camera module 280 of FIG. 2).

In operation 927, the processor 920 may provide an image obtained from a camera module (e.g., the camera module 280 of FIG. 2) and a graphic object capable of transmitting a photographed image to the shared external electronic device to a camera interface.

According to an embodiment, when the graphic object is selected in the camera interface, the processor 920 may convert the photographed image using a set transmission method and/or transmission quality (e.g., HD/FHD/UHD/4K/8K), and may transmit the converted photographed image to the shared external electronic device 950.

According to various embodiments, the processor 920 may further include, prior to the operation 925, determining a third azimuth angle including the moving direction of the electronic device. In operation 925, when the first azimuth angle, the second azimuth angle, and/or the third azimuth angle are included in the camera field of view range (e.g., the field of view range (b) of the camera of FIG. 7), the processor 920 may determine the external electronic device 950 as the shared external electronic device.

Figure 10:
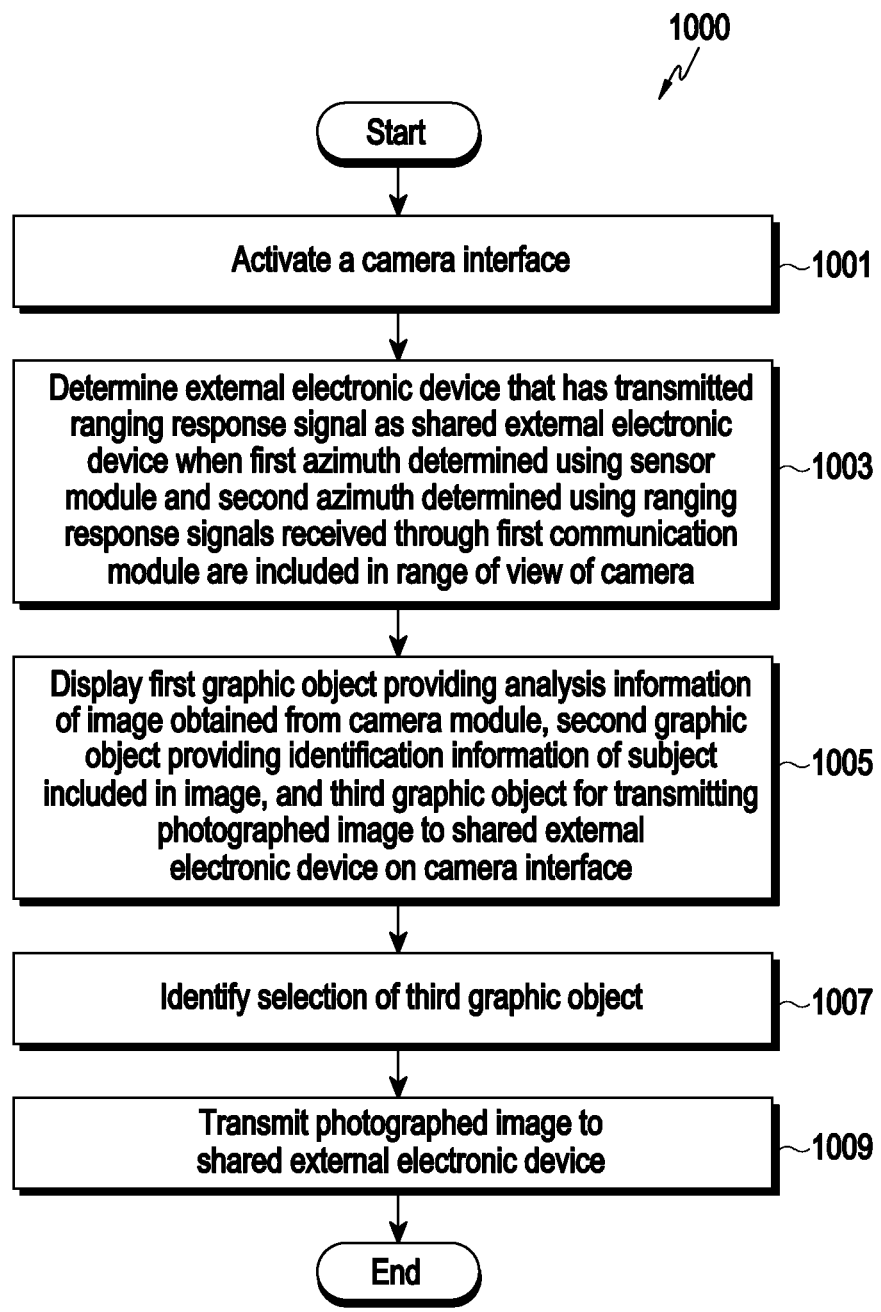
FIG. 10 is a flowchart illustrating an image transmission operation in an electronic device, according to various embodiments.

FIG. 10 is a flowchart 1000 illustrating image transmission operations in an electronic device according to various embodiments. The image transmission operations may include operations 1001 to 1009. According to an embodiment, at least one of operations 1001 to 1009 may be omitted, the order of some operations may be changed, or another operation may be added. The image transmission operations may be performed by the electronic device 101 of FIG. 1, the processor 120 of FIG. 1, the electronic device 201 of FIG. 2, and/or the processor 220 of FIG. 2.

In operation 1001, the electronic device 201 may activate a camera interface.

According to an embodiment, when the camera interface is activated according to a user's request, the electronic device 201 may display an image acquired from a camera module (e.g., the camera module 280 of FIG. 2) on the camera interface.

In operation 1003, when a first azimuth angle determined using a sensor module (e.g., the sensor module 276 of FIG. 2) and a second azimuth angle determined using the ranging response signals received through the plurality of antennas of the first communication module (e.g., the first communication module 291 of FIG. 2) are included in the range of view of the camera, the electronic device 201 may determine the external electronic device that has transmitted the ranging response signal as the shared external electronic device.

According to an embodiment, the electronic device 201 may determine the first azimuth angle including a photographing direction of the electronic device 201 that is a relative orientation from the magnetic north direction, which may be referred to as an absolute orientation, based on the raw data received from the sensor module. The electronic device 201 may determine direction information (e.g., angle of arrival (AOA)) of the external electronic device using the ranging response signals received from the external electronic device through the first communication module, and may determine the second azimuth angle determined based on an azimuth difference between the magnetic north direction, which may be referred to as an absolute direction, obtainable through the sensor module, and the direction information (e.g., angle of arrival (AOA)) of the external electronic device as a relative direction. The electronic device 201 may identify the camera field of view range corresponding to the currently activated photographing mode among multiple photographing modes (e.g., ultra-wide mode, wide mode, telephoto mode, panorama mode, single take mode, and/or vide mode). The electronic device 201 may identify whether the first azimuth angle and the second azimuth angle are included in the range of view angles of the camera corresponding to the second photographing mode when changing from the first photographing mode (e.g., ultra-wide mode) to the second photographing mode (e.g., telephoto mode) among the plurality of photographing modes.

According to an embodiment, in operation 1005, the electronic device 201 may display a first graphic object (e.g., the first graphic object 1130 of FIG. 11) that provides analysis information of the image obtained from the camera module (e.g., the camera module 280 of FIG. 2), a second graphic object (e.g., the second graphic object 1150 of FIG. 11) that provides identification information of a subject included in the image, and/or a third graphic object for transmitting a photographed image to a shared external electronic device (e.g., the third graphic object 1170 of FIG. 11) on the camera interface.

According to an embodiment, the electronic device 201 may analyze the image acquired from the camera module, and display a first graphic object (e.g., a scene message) corresponding to the analysis result, on the camera-interface, interface.

According to an embodiment, the electronic device 201 may display, on the camera interface, a second graphic object providing identification information (e.g., name information corresponding to face authentication information) on the subject included in the image obtained from the camera module in an area adjacent to the subject displayed in the image.

According to an embodiment, the electronic device 201 may display a third graphic object capable of transmitting a photographed image on the camera interface.

According to an embodiment, the electronic device 201, on the camera interface, may use the third graphic object as a storage graphic object for storing the photographed image in a memory (e.g., the memory 230 of FIG. 2) without transmitting, and then change the third graphic object to a graphic object for transmission for transmitting the photographed image when the first azimuth angle determined based on the sensor module (e.g., the sensor module 276 of FIG. 2) and the second azimuth angle determined based on the ranging response signal received from the external electronic device are included in the camera field of view range corresponding to the currently activated photographing mode. According to an embodiment, the electronic device 201 may display model information of the shared external electronic device or name information designated by the user of the shared external electronic device or the user of the electronic device on the third graphic object as an indicator. The electronic device may display different indicators (directions of people, things, or shared external electronic devices), based on at least one of analysis information of the image acquired from the camera module in the third graphic object, location information (e.g., distance information and/or direction information) of the shared external electronic device, or identification information of the shared external electronic device received through the second communication module.

In operation 1007, the electronic device 201 may identify the selection of the third graphic object in the camera interface.

In operation 1009, the electronic device 201 may transmit the photographed image to the shared external electronic device in response to the selection of the third graphic object.

According to an embodiment, the electronic device 201 may, in response to the selection of the third graphic object, detect an image corresponding to the selection time of the third graphic object in the memory (e.g., the memory 230 of FIG. 2) that stores the images acquired from the camera module (e.g., the camera module 280 of FIG. 2) from the time of activation of the camera interface as the photographed image, and may convert the photographed image according to a specified transmission method and transmission quality information and automatically transmit the converted image to the shared external electronic device.

According to an embodiment, the electronic device 201 may, in response to the selection of the third graphic object, photograph an image obtained from a camera module (e.g., the camera module 280 of FIG. 2), may store the photographed image in a memory (e.g., the memory 230 of FIG. 2), and may convert the photographed image stored in the memory according to a specified transmission method and transmission quality information and automatically transmit the converted image to the shared external electronic device.

According to an embodiment, the electronic device 201 may, in response to the selection of the third graphic object, display notification information (e.g., transmission time and/or transmission speed) related to transmission of the photographed image on a quick panel and/or the third graphic object when automatically sending a shot image to a shared external electronic device. For example, the electronic device 201 may classify the time from the start of transmission of the photographed image to the completion of transmission by color in the third graphic object and display it in real time.

According to various embodiments, when any one of the video mode, panorama mode, or single take mode is activated in the camera interface, the electronic device 201 may start photographing when a third graphic object corresponding to the start is input, and may determine a shared external electronic device during the photographing period. During the photographing period, when the first azimuth angle determined using the sensor module (e.g., the sensor module 276 in FIG. 2) and the second azimuth angle determined using the ranging response signals received from the external electronic device are included in the range of view angle of the camera, the electronic device 201 may determine the external electronic device that has transmitted the ranging response signal as the shared external electronic device. When a third graphic object corresponding to the end is input during the photographing period, the electronic device 201 may end photographing and automatically transmit the photographed video file to the shared external electronic device.

Figure 11:
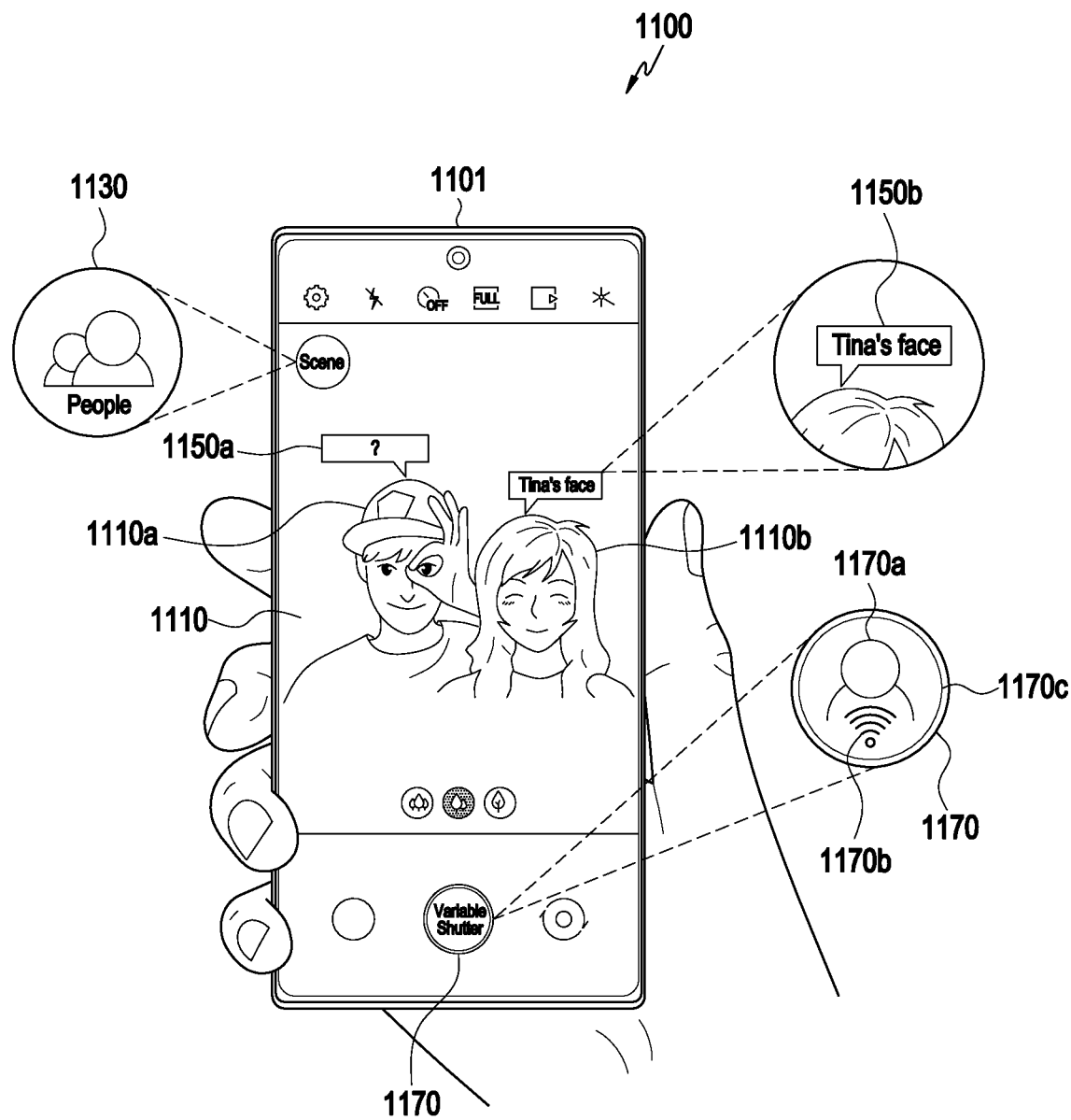
FIG. 11 is a diagram illustrating an image transmission operation in an electronic device, according to various embodiments.

FIG. 11 is a diagram 1100 illustrating an image transmission operation in an electronic device according to various embodiments.

Referring to FIG. 11, when the camera interface (e.g., the preview mode of the camera) is activated and the camera interface is displayed on the display, the electronic device 1101 (e.g., the electronic device 101 of FIG. 1, the electronic device 201 of FIG. 2, the electronic device 401 of FIG. 4, or the electronic device 701 of FIG. 7) may display the image 1110 acquired from the camera module (e.g., the camera module 280 of FIG. 2) on the camera interface, and may display a first graphic object 1130 that provides analysis information of the image acquired from the camera module, second graphic objects 1150a, 1150b providing identification information of the subjects 1110a, 1110b included in the image 1110, and/or a third graphic object 1170 for transmitting a photographed image to the shared external electronic device.

The electronic device 1101 may analyze the image acquired from the camera module on the first graphic object 1130, and display the first graphic object corresponding to the analysis result as a scene message. The electronic device 1101 may identify that the subjects 1110a and 1110b included in the image are people as a result of analyzing the image 1110 obtained from the camera module, and display the information related to the person as the first graphic object 1130.

The electronic device 1101 may analyze the image 1110 acquired from the camera module, and may recognize the faces of the subjects 1110a and 1110b using a face recognition function when it is determined that the subject included in the image 1110 is a human as a result of the analysis. The electronic device 1101 may identify that the first subject 1110a among the subjects 1110a and 1110b does not have registered face authentication information using the face recognition function, and may display an unregistered message (e.g., "?") indicating that there is no identification information in an area adjacent to the first subject 1110a displayed in the image 1110 as the second graphic object 1150a. The electronic device 1101 may identify that the second subject 1110b among the subjects 1110a and 1110b has registered face authentication information using the face recognition function, and may display a "Tina's face" message indicating identification information in an area adjacent to the second subject 1110b displayed in the image 1110 as the second graphic object 1150b.

The electronic device 1101 may photograph the registered profile information (e.g., the registered photo of the second subject) 1170a or the image 1110 for the second subject 1110b for which the identification information is identified among the subjects included in the image 1110 to display the indicator 1170c including a photo image 1170a corresponding to the second subject 1110b in which only a certain portion corresponding to the second subject 1110b is cropped, and direction information 1170b of a shared external electronic device related to the second subject 1110b on the third graphic object 1170. When the contact information and profile information of the second subject 1110b are registered in the specific account (e.g., Samsung account) to which the electronic device 1101 is registered, the electronic device 1101 may share profile information of the second subject 1110b registered in the specific account, and display the profile information 1170a (e.g., the registered photo of the second subject) of the second subject 1110b registered in the specific account on the indicator 1170c of the third graphic object 1170. When contact information and profile information of the second subject 1110b are updated (e.g., modified and/or newly registered) in the specific account, the electronic device 110 may display the updated profile information 1170a (e.g., a photo of the corrected and/or newly registered second subject) of the second subject 1110b on the indicator 1170c of the third graphic object 1170. When the third graphic object 1170 is selected, the electronic device 1101 may convert the photographed image according to a specified transmission method and transmission quality information and transmit the converted image to the shared external electronic device.

Figure 12:
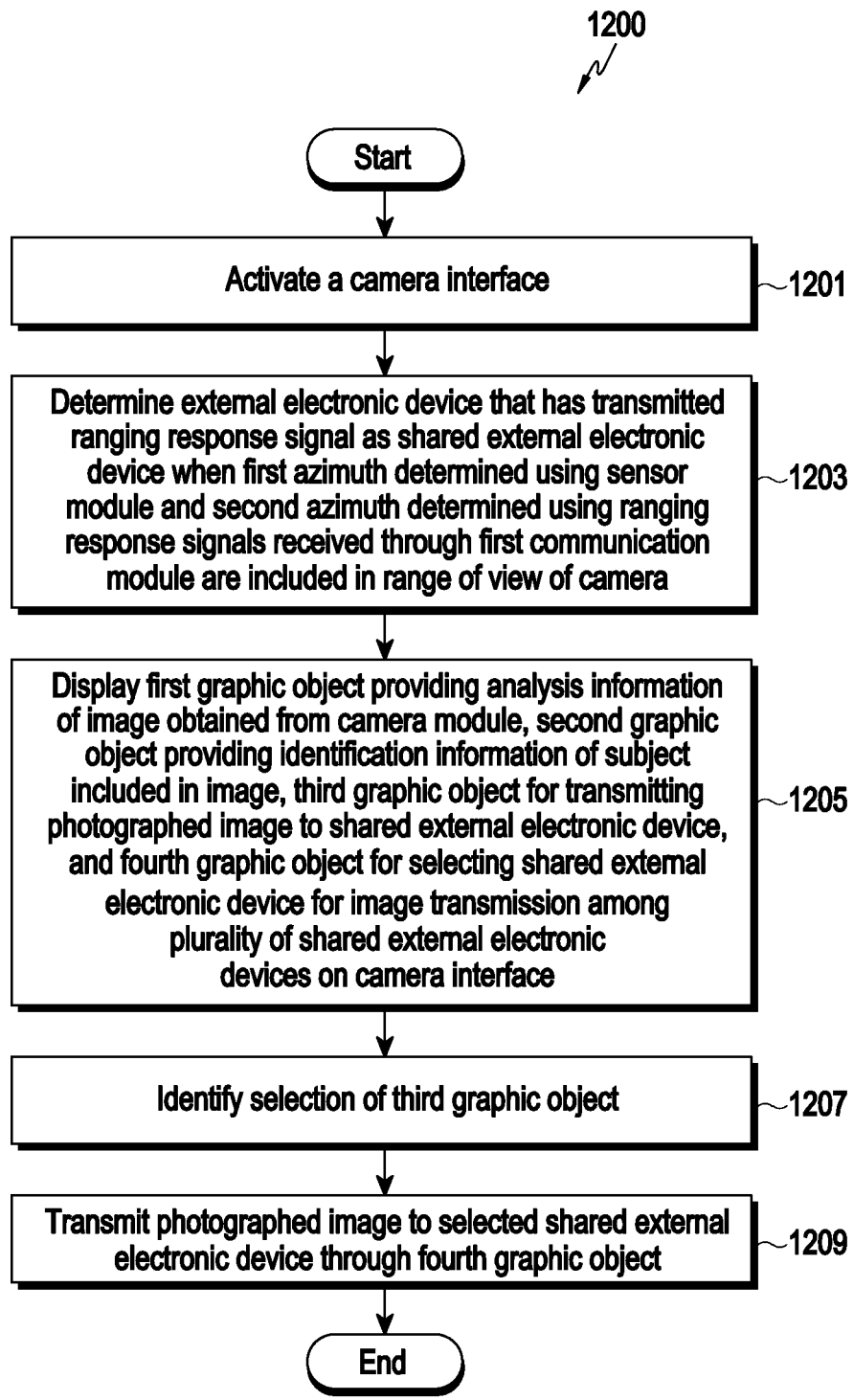
FIG. 12 is a flowchart illustrating an image transmission operation in an electronic device, according to various embodiments.

FIG. 12 is a flowchart 1200 illustrating an image transmission operation in an electronic device according to various embodiments. The image transmission operations may include operations 1201 to 1209. According to an embodiment, at least one of operations 1201 to 1209 may be omitted, the order of some operations may be changed, or another operation may be added. The image transmission operations may be performed by the electronic device 101 of FIG. 1, the processor 120 of FIG. 1, the electronic device 201 of FIG. 2, or the processor 220 of FIG. 2.

In operation 1201, the electronic device 201 may activate a camera interface.

According to an embodiment, when the camera interface is activated according to the user's request, the electronic device 201 may activate a camera module (e.g., the camera module 280 of FIG. 2) to display an image acquired from the camera module on the camera interface.

In operation 1203, when the first azimuth angle determined using the sensor module (e.g., the sensor module 276 of FIG. 2) and the second azimuth angle determined by using the ranging response signals received through the plurality of antennas of the first communication module (e.g., the first communication module 291 of FIG. 2) are included in the range of view angle of the camera corresponding to the activated photographing mode, the electronic device 201 may determine the external electronic device that has transmitted the ranging response signal as the shared external electronic device.

According to an embodiment, the electronic device 201 may determine a first azimuth angle including a photographing direction of the electronic device 201 that is a relative orientation from the magnetic north direction, which may be referred to as an absolute orientation, based on raw data received from the sensor module. The electronic device 201 may determine direction information (e.g., angle of arrival (AOA)) of the external electronic device using the ranging response signals received from the external electronic device through the first communication module, and determine a second azimuth angle based on a difference in azimuth between the magnetic north direction, which may be referred to as an absolute direction, obtainable through the sensor module, and direction information (e.g., angle of arrival (AOA)) of the external electronic device which is a relative direction.

According to an embodiment, the electronic device 201 may identify the camera field of view range corresponding to the currently activated photographing mode among a plurality of photographing modes (e.g., ultra-wide mode, wide mode, telephoto mode, panorama mode, single take mode, and/or video mode).

In operation 1205, the electronic device 201 may display a first graphic object (e.g., the first graphic object 1330 of FIG. 13A) that provides analysis information of the image obtained from the camera module (e.g., the camera module 280 of FIG. 2), a second graphic object (e.g., the second graphic object 1350 of FIG. 13A) that provides identification information of the subject included in the image, a third graphic object (e.g., the third graphic object 1370 of FIG. 13A) for transmitting the photographed image to the shared external electronic device, and/or a fourth graphic object for selecting a shared external electronic device for image transmission among a plurality of shared external electronic devices (e.g., the fourth graphic object 1390 of FIG. 13A) on the camera interface.

According to an embodiment, the electronic device 201 may analyze the image acquired from the camera module on the camera interface and display a first graphic object (e.g., a scene message) corresponding to the analysis result.

According to an embodiment, the electronic device 201 may display a second graphic object that provides identification information (e.g., name information corresponding to face authentication information) on the subject included in the image acquired from the camera module 280 on the camera interface in an area adjacent to the subject displayed in the image. The electronic device 201 may determine a location of an adjacent area corresponding to a location that does not cover a subject (e.g., a face) recognized through a face recognition function, and may display the second graphic object in the determined adjacent area.

According to an embodiment, the electronic device 201 may display a third graphic object for transmitting the photographed image to the shared external electronic device in the camera interface.

According to an embodiment, the electronic device 201, in the camera interface, uses the third graphic object as a storage graphic object for storing the photographed image in a memory (e.g., the memory 230 of FIG. 2) without transmitting, and then, may use the third graphic object by changing it into a graphic object for transmission for transmitting a photographed image when a first azimuth angle determined based on a sensor module (e.g., the sensor module 276 of FIG. 2) and a second azimuth angle determined based on the ranging response signal received from the external electronic device are included in the camera field of view range corresponding to the currently activated photographing mode.

According to an embodiment, the electronic device 201 may display model information of the shared external electronic device or name information designated by the user of the shared external electronic device or the user of the electronic device on the third graphic object as an indicator. The electronic device 201 may display different indicators (directions of people, things, or shared external electronic devices), based on at least one of analysis information of the image acquired from the camera module in the third graphic object, location information from a shared external electronic device (e.g., distance information and/or direction information), or identification information of the shared external electronic device received through the second communication module. According to an embodiment, the electronic device 201 may display a fourth graphic object from which a shared external electronic device for transmitting a photographed image among the plurality of shared external electronic devices may be selected by a user when the first azimuth angle and the second azimuth angle determine a plurality of shared external electronic devices included in the field of view range of the camera.

In operation 1207, the electronic device 201 may identify the selection of the third graphic object in the camera interface.

In operation 1209, the electronic device 201 may transmit the photographed image to the selected shared external electronic device through the fourth graphic object in response to the selection of the third graphic object.

According to an embodiment, the electronic device 201 may, in response to the selection of the third graphic object, detect an image corresponding to the selection time of the third graphic object in the memory (e.g., the memory 230 of FIG. 2) that stores the image acquired from the camera module (e.g., the camera module 280 of FIG. 2) from the time of activation of the camera interface as a photographed image, and convert the photographed image according to a specified transmission method and transmission quality information to automatically transmit the converted image to the shared external electronic device.

According to an embodiment, the electronic device 201 takes an image obtained from a camera module (e.g., the camera module 280 of FIG. 2) in response to the selection of the third graphic object, store the photographed image in a memory (e.g., the memory 230 of FIG. 2), and convert the photographed image stored in the memory according to a specified transmission method and transmission quality information and automatically transmit the converted image to the shared external electronic device.

According to an embodiment, in response to the selection of the third graphic object, the electronic device 201 may display notification information (e.g., transmission time and/or transmission speed) related to transmission of the photographed image on a quick panel and/or the third graphic object when automatically transmitting a shot image to a shared external electronic device. For example, the electronic device 201 may classify the transmission start to the transmission completion of the photographed image by color in the third graphic object and display the same in real time.

Figure 13A:
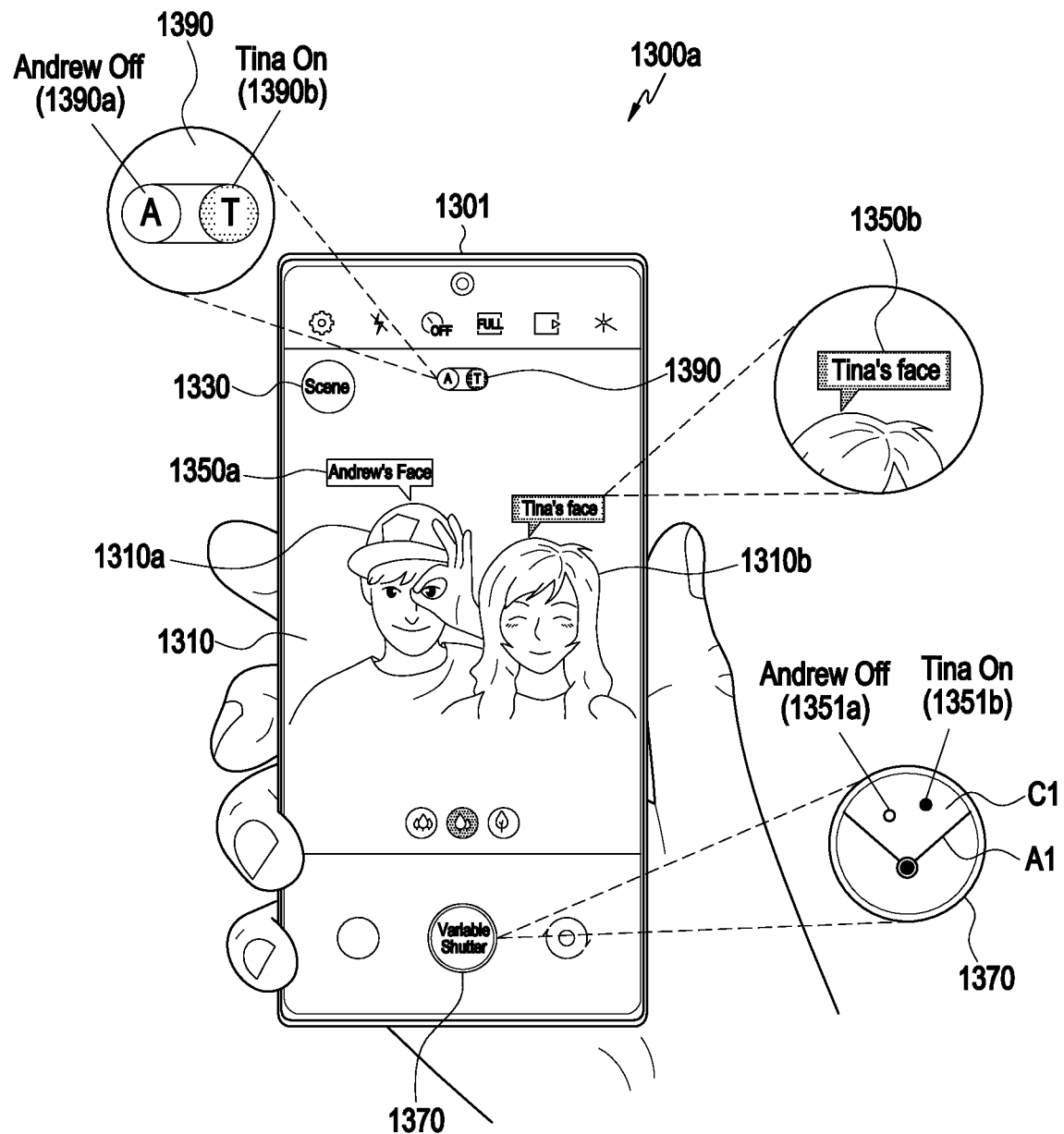
FIGS. 13A and 13B are diagrams illustrating an image transmission operation in an electronic device, according to various embodiments.
Figure 13B:
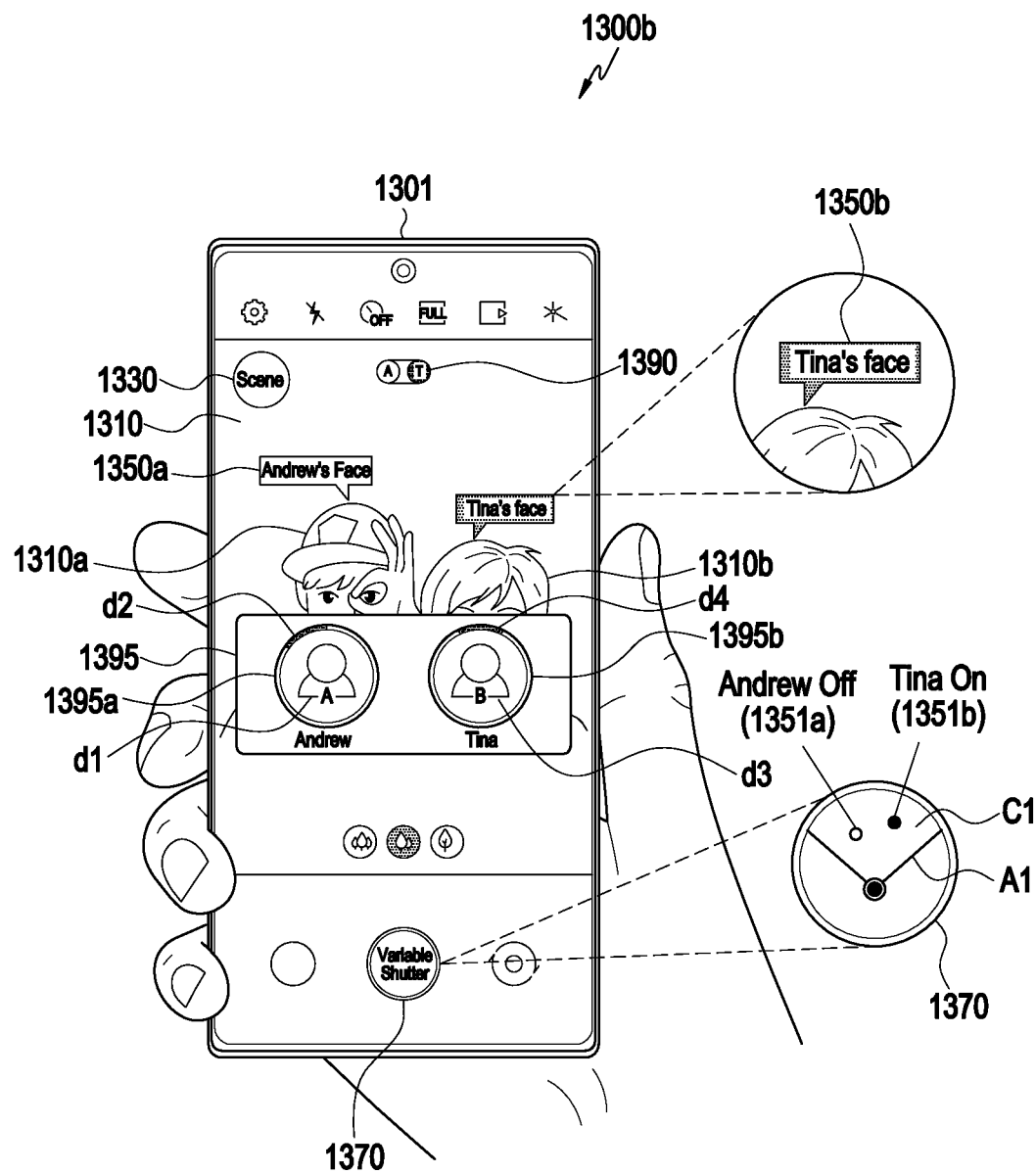

FIGS. 13A and 13B are diagrams 1300a to 1300b illustrating an image transmission operation in an electronic device according to various embodiments.

Referring to FIGS. 13A and 13B, when a camera interface (e.g., a camera preview mode) is activated and the camera interface is shown on the display, the electronic device 1301 (e.g., the electronic device 101 of FIG. 1, the electronic device 201 of FIG. 2, the electronic device 401 of FIG. 4, or the electronic device 701 of FIG. 7) may display an image 1310 acquired from a camera module (e.g., the camera module 280 of FIG. 2) on the camera interface, and display a first graphic object 1330 that provides analysis information of the image acquired from the camera module, second graphic objects 1350a, 1350b that provide identification information of the subjects 1310a, 1310b included in the image 1310, a third graphic object 1370 for transmitting a photographed image to a shared external electronic device, and/or fourth graphic objects 1390, 1395 through which a user may select a shared external electronic device for transmitting a photographed image from among a plurality of shared external electronic devices.

The electronic device 1301 may analyze the image acquired from the camera module on the first graphic object 1330, and display the first graphic object corresponding to the analysis result as a scene message. The electronic device 1301 may identify that the subjects 1310a and 1310b included in the image are people as a result of analyzing the image 1310 obtained from the camera module, and display the information related to the person as the first graphic object 1330.

The electronic device 1301 may analyze the image 1310 obtained from the camera module, and recognize the faces of the subjects 1310a and 1310b using a face recognition function when it is determined that the subject included in the image 1310 is a human as a result of the analysis. The electronic device 1301 may identify that there is face authentication information in which the first subject 1310a is registered among the subjects 1310a and 1310b using the face recognition function, and display the message "Andrew's face" indicating identification information in an area adjacent to the first subject 1310a displayed in the image 1310 as the second graphic object 1350a. The electronic device 1301 may identify that there is face authentication information in which the second subject 1310b is registered among the subjects 1310a and 1310b using the face recognition function, and display a "Tina's face" message indicating identification information in an area adjacent to the second subject 1310b displayed in the image 1310 as the second graphic object 1350b.

The electronic device 1301 may display an indicator (e.g., Mini-Map) including a first location icon 1351a indicating the first shared external electronic device included in the shared area c1 mapped to the angle of view range A1 of the camera and a second location icon 1351b indicating the second shared external electronic device on the third graphic object 1370 for transmitting the photographed image when a first shared external electronic device related to the first subject 1310a (e.g., a first external electronic device located close to the first subject) and a second shared external electronic device related to the second subject 1310b (e.g., a second external electronic device located close to the second subject) are determined.

Referring to FIG. 13A, when a first shared external electronic device related to the first subject 1310a (e.g., a first external electronic device located close to the first subject) and a second shared external electronic device related to the second subject 1310b (e.g., a second external electronic device located close to the second subject) are determined, the electronic device 1301 may display a fourth graphic object 1390 including a first icon 1390a representing a first shared external electronic device related to the first subject 1310a and a second icon 1390b representing a second shared external electronic device related to the second subject 1310b.

The electronic device 1301 may arrange a display order based on location information (e.g., distance information and/or direction information) for each of the plurality of shared external electronic devices, and provide the fourth graphic object 1390 displaying the first icon 1390a indicating the first shared external electronic device related to the first subject 1310a on the left side and the second icon 1390b indicating a second shared external electronic device related to the second subject 1310b on the right side.

When the second icon 1390b in the fourth graphic object is selected by the user, the electronic device 1301 may display that the first icon 1390a is deactivated ("Andrew Off") and display that the second icon 1390b is activated ("Tina On"). The electronic device 1301 may display that the second graphic object 1350a corresponding to the first subject 1310a is deactivated according to the activation of the second icon 1390b in the fourth graphic object 1390, and display that the second graphic object 1350b corresponding to the second subject 1310b is activated. The electronic device 1301 may display the first location icon 1351a indicating the first shared external electronic device related to the first subject 1310a as inactive in the third graphic object 1370 provided as an indicator in the form of a mini map according to the activation of the second icon 1390b in the fourth graphic object 1390, and display the second location icon 1351b indicating the second shared external electronic device related to the second subject 1310b as active.

The electronic device 1301 may interlock the fourth graphic object 1390 and/or the second graphic objects 1350a, 1350b, indicate that the first graphic object 1350a corresponding to the first subject 1310a is displayed as inactive and display ("Andrew Off") that the first icon 1390a is deactivated in the fourth graphic object 1390, and display ("Tina On") that the second icon 1390b is activated when activation of the second graphic object 1350b corresponding to the second subject 1310b is selected among the second graphic objects 1350a, 1350b.

When the third graphic object 1370 is selected, the electronic device 1301 may convert the photographed image of the image 1310 according to a specified transmission method and transmission quality information to a second shared external electronic device related to the currently activated second subject 1310b and automatically transmits the converted image.

Referring to FIG. 13B, the electronic device 1301 may display the fourth graphic object 1395 in the form of a pop-up message on the camera interface when a first shared external electronic device related to the first subject 1310a (e.g., a first external electronic device located close to the first subject) and a second shared external electronic device related to the second subject 1310b (e.g., a second external electronic device positioned close to the second subject) are determined, and the third graphic object 1370 is selected. The electronic device 1301 may display a first icon 1395a indicating a first shared external electronic device related to the first subject 1310a and a second icon 1395b indicating a second shared external electronic device related to the second subject 1310b on the fourth graphic object 1395. The electronic device 1301 may display the profile information d1 of the first subject 1310a and the direction information d2 of the first shared external electronic device on the first icon 1395a, and display the profile information d3 of the second subject 1310b and the direction information d4 of the second shared external electronic device on the second icon 1395b. The electronic device 1301 may activate the icon selected by the user among the first icon 1395a and the second icon 1395b displayed on the fourth graphic object 1395, and convert the photographed image to the shared external electronic device corresponding to the icon selected by the user according to a specified transmission method and transmission quality information and automatically transmit the converted image.

Alternatively or additionally, the electronic device 1301 may switch to a screen for selecting a transmission target without separately providing the fourth graphic object on the camera interface as shown in FIGS. 13A and 13B when the first shared external electronic device related to the first subject 1310a and the second shared external electronic device related to the second subject 1310b are determined and the third graphic object 1370 is selected. When the selection of the transmission target is completed, the electronic device may switch back to the camera interface and automatically transmit the photographed image to the shared external electronic device corresponding to the selected transmission target according to the specified transmission method and transmission quality information.

Figure 14:
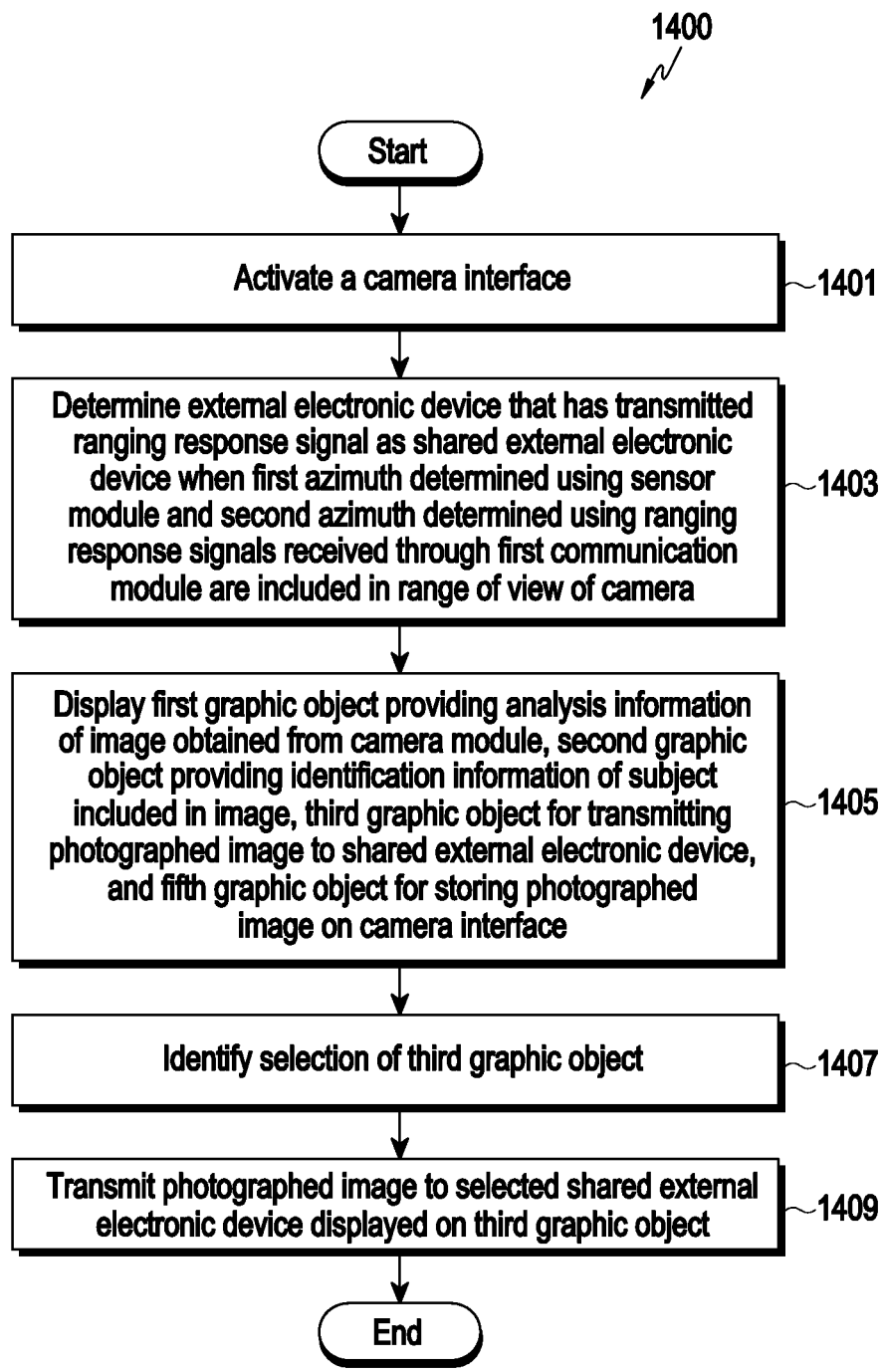
FIG. 14 is a flowchart illustrating an image transmission operation in an electronic device, according to various embodiments.

FIG. 14 is a flowchart 1400 illustrating an image transmission operation in an electronic device according to various embodiments. The image transmission operations may include operations 1401 to 1409. According to an embodiment, at least one of operations 1401 to 1409 may be omitted, the order of some operations may be changed, or another operation may be added. The image transmission operations may be performed by the electronic device 101 of FIG. 1, the processor 120 of FIG. 1, the electronic device 201 of FIG. 2, or the processor 220 of FIG. 2.

In operation 1401, the electronic device 201 may activate the camera interface.

According to an embodiment, the electronic device 201 may activate a camera module (e.g., the camera module 280 of FIG. 2) when the camera interface is activated according to a user's request to display an image obtained from the camera module on the camera interface.

In operation 1403, when a first azimuth angle determined using a sensor module (e.g., the sensor module 276 of FIG. 2) and a second azimuth angle determined using the ranging response signals received through the plurality of antennas of the first communication module (e.g., the first communication module 291 of FIG. 2) are included in the range of view of the camera, the electronic device 201 may determine the external electronic device that has transmitted the ranging response signal as the shared external electronic device.

According to an embodiment, the electronic device 201 may determine a first azimuth angle including a photographing direction of the electronic device 201 that is a relative orientation from the magnetic north direction, which may be referred to as an absolute orientation, based on the raw data received from the sensor module. The electronic device 201 may determine direction information (e.g., angle of arrival (AOA)) of the external electronic device using a plurality of duplicate signals received from the external electronic device through the first communication module, and determine the second azimuth angle, based on the difference in the azimuth between the magnetic north direction, which may be referred to as an absolute bearing, and the direction information (e.g., angle of arrival (AOA)) of the external electronic device, which is a relative direction, which may be obtained through the sensor module.

According to an embodiment, the electronic device 201 may identify the camera field of view range corresponding to the currently activated photographing mode among a plurality of photographing modes (e.g., ultra-wide mode, wide mode, telephoto mode, panorama mode, single-take mode, and/or video mode). The electronic device 201 may identify whether the first azimuth angle and the second azimuth angle are included in the range of the angle of view of the camera corresponding to the second photographing mode when changing from the first photographing mode (e.g., ultra-wide mode) to the second photographing mode (e.g., telephoto photographing mode) among the plurality of photographing modes.

In operation 1405, the electronic device 201 may display a first graphic object (e.g., the first graphic object 1530 of FIG. 15) that provides analysis information of the image obtained from the camera module (e.g., the camera module

280 of FIG. 2), a second graphic object (e.g., the second graphic object 1550 of FIG. 15) that provides identification information of the subject included in the image, a third graphic object (e.g., the third graphic object 1570 of FIG. 15) for transmitting the photographed image to the shared external electronic device, and/or a fifth graphic object for storing the photographed image (e.g., the fifth graphic object 1590 of FIG. 15) on the camera interface.

According to an embodiment, the electronic device 201 may analyze the image acquired from the camera module on the camera interface and display a first graphic object (e.g., a scene message) corresponding to the analysis result.

According to an embodiment, the electronic device 201 may display a second graphic object that provides identification information (e.g., name information corresponding to face authentication information) on the subject included in the image acquired from the camera module 280 on the camera interface in an area adjacent to the subject displayed in the image.

According to an embodiment, the electronic device 201 may display a third graphic object for transmitting the photographed image to the shared external electronic device in the camera interface.

According to an embodiment, the electronic device 201 may provide the third graphic object in a floating form when determining a plurality of shared external electronic devices in which the first azimuth angle and the second azimuth angle are included in the range of view angle of the camera. When the third graphic object is provided in a floating form, the electronic device 201 may provide the same to be basically displayed within the one-handed control area (e.g., at the lower right corner). The one-handed control area may indicate an area that may be manipulated by the user's hand holding the electronic device 201, and the electronic device 201 may display a third graphic object in a floating form on the lower left or lower right of the camera interface according to a position where the user holds the electronic device 201. The electronic device 201 may display a third graphic object provided in a floating form at a position adjusted by the user. The electronic device 201 may provide a fifth graphic object for storing the photographed image in a fixed form when providing the third graphic object in a floating form for transmitting the photographed image on the camera interface. When a gesture (e.g., long press) is detected on the floating third graphic object, the electronic device 201 may provide a pop-up menu for determining a transmission target or displays a UWB communication related setting menu. The electronic device 201 may display information on the plurality of shared external electronic devices as an indicator on the third graphic object in the transmission order of the photographed images. The transmission order of the photographed images may be determined by the quality of signals (e.g., RSSI strength and/or BLE reception size) received from a plurality of shared external electronic devices through the second communication module, and/or a user's setting. For example, the electronic device 201 may display information on the first shared external electronic device among the plurality of shared external electronic devices in the third graphic object as an indicator according to a transmission order, and transmit a photographed image to the first shared external electronic device when the third graphic object for displaying information on the first shared external electronic device as an indicator is selected. The electronic device 201 may display information on the second shared external electronic device among the plurality of shared external electronic devices on the third graphic object as an indicator according to the transmission order after transmitting the photographed image to the first shared external electronic device, and transmit the photographed image to the second shared external electronic device when the third graphic object that displays information on the second shared external electronic device as an indicator is selected. According to an embodiment, the electronic device 201 may display a fifth graphic object that only stores the photographed image in a memory (e.g., the memory 230 of FIG. 2) without transmitting the photographed image. The electronic device 201 may provide a fifth graphic object with a fixed shutter that stores only a photographed image without transmission, and may not display a UWB communication related indicator in the fifth graphic object.

In operation 1407, the electronic device 201 may identify the selection of the third graphic object in the camera interface.

In operation 1409, the electronic device 201 may transmit the photographed image to the shared external electronic device displayed as an indicator on the third graphic object in response to the selection of the third graphic object.

According to an embodiment, the electronic device 201 may detect an image corresponding to the selection time of the third graphic object as a photographed image in the memory (e.g., the memory 230 of FIG. 2) that stores the image acquired from the camera module (e.g., the camera module 280 of FIG. 2) from the time of activation of the camera interface in response to the selection of the third graphic object, and convert the photographed image according to a specified transmission method and transmission quality information and automatically transmit the converted image to the shared external electronic device.

According to an embodiment, in response to the selection of the third graphic object, the electronic device 201 may photograph an image obtained from a camera module (e.g., the camera module 280 of FIG. 2), store the photographed image in a memory (e.g., the memory 230 of FIG. 2), and convert the photographed image stored in the memory according to a specified transmission method and transmission quality information and automatically transmit the converted image to the shared external electronic device.

According to an embodiment, in response to the selection of the fifth graphic object, the electronic device 201 may detect, as a photographed image, an image corresponding to the selection time of the third graphic object in the first area of the memory (e.g., the memory 230 of FIG. 2) storing the image obtained from the camera module (e.g., the camera module 280 of FIG. 2) from the time when the camera interface is activated, and store the photographed image in the second area of the memory.

According to an embodiment, in response to the selection of the fifth graphic object, the electronic device 201 may photograph an image obtained from a camera module (e.g., the camera module 280 of FIG. 2), and store the photographed image in a second area of a memory (e.g., the memory 230 of FIG. 2).

Figure 15:
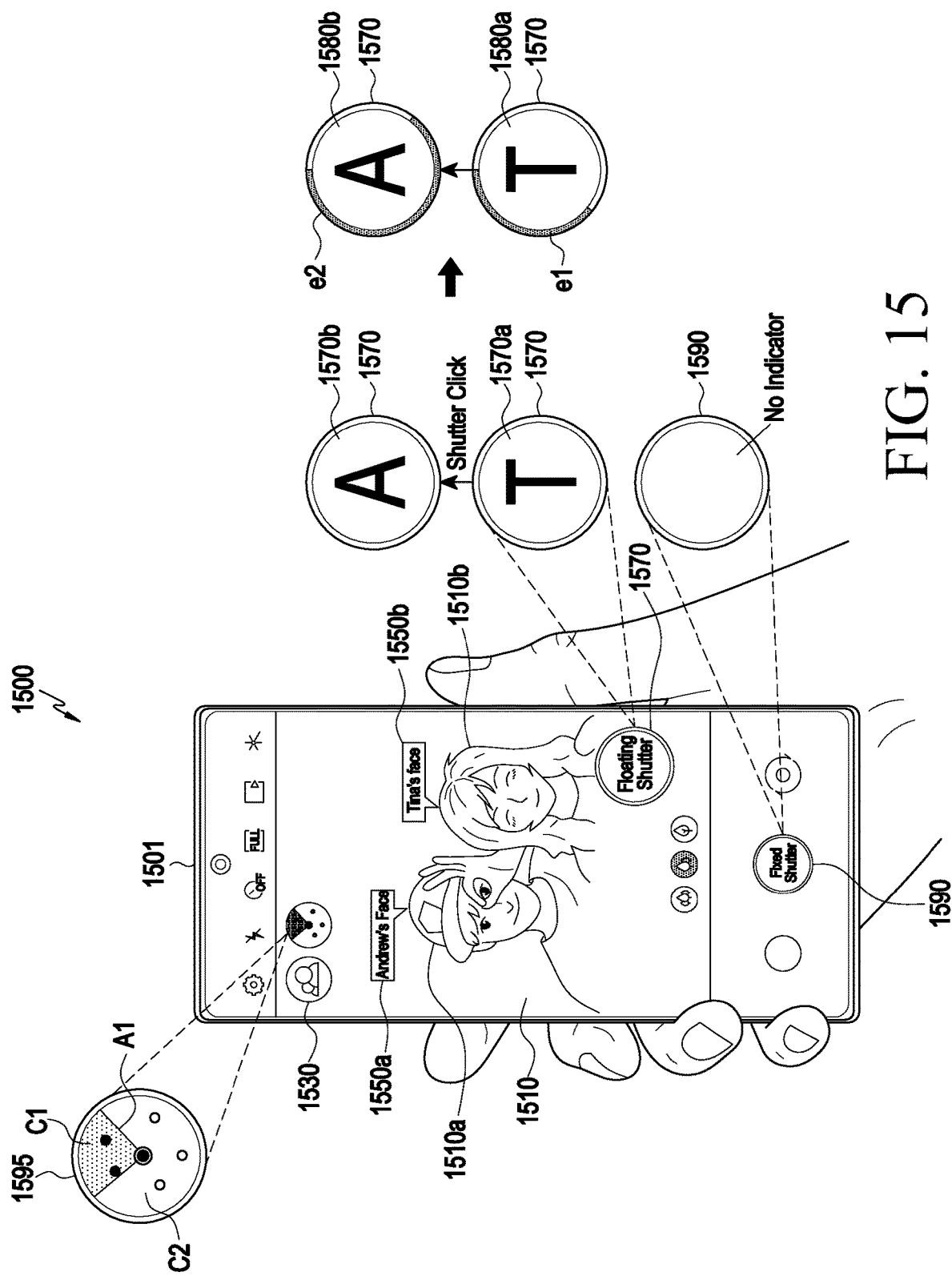
FIG. 15 is a diagram illustrating an image transmission operation in an electronic device, according to various embodiments.

FIG. 15 is a diagram 1500 illustrating an image transmission operation in an electronic device according to various embodiments.

Referring to FIG. 15, when a camera interface (e.g., the camera's preview mode) is activated and the camera interface is shown on the display, the electronic device 1501 (e.g., the electronic device 101 of FIG. 1, the electronic device 201 of FIG. 2, the electronic device 401 of FIG. 4, or the electronic device 701 of FIG. 7) may display an image 1510 acquired from a camera module (e.g., the camera module 280 of FIG. 2) on the camera interface, and display a first graphic object 1530 that provides analysis information of the image acquired from the camera module, second graphic objects 1550a, 1550b that provide identification information of the subjects 1510a, 1510b included in the image 1510, a third graphic object 1570 for transmitting a photographed image to a shared external electronic device, and/or a fifth graphic object 1590 for storage of a photographed image. The electronic device 1501 may search for a plurality of nearby electronic devices capable of performing communication through a UWB communication module that is a first communication module (e.g., the first communication module 291 of FIG. 2), and provide a sixth graphic object 1595 that divides and displays the plurality of electronic devices into a shared external electronic device included in the range of view of the camera and non-shared external electronic devices not included in the range of view of the camera.

The electronic device 1501 may analyze the image acquired from the camera module on the first graphic object 1530, and display the first graphic object corresponding to the analysis result as a scene message. The electronic device 1501 may determine that the subjects 1510a and 1510b included in the image are people as a result of analyzing the image 1510 obtained from the camera module, and display information related to the person as the first graphic object 1530.

The electronic device 1501 may analyze the image 1510 obtained from the camera module, and recognize the faces of the subjects 1510a and 1510b using a face recognition function when it is determined that the subject included in the image 1510 is a human as a result of the analysis. The electronic device 1501 may identify that there is face authentication information in which the first subject 1510a is registered among the subjects 1510a and 1510b using the face recognition function, and display the message "Andrew's face" indicating identification information in an area adjacent to the first subject 1510a displayed in the image 1510 as the second graphic object 1550a. The electronic device 1501 may identify that there is face authentication information in which the second subject 1510b is registered among the subjects 1510a and 1510b using the face recognition function, and display the message "Tina's face" message indicating identification information in an area adjacent to the second subject 1510b displayed in the image 1510 as the second graphic object 1550b.

When a first shared external electronic device related to the first subject 1510a (e.g., a first external electronic device located close to the first subject) and a second shared external electronic device related to the second subject 1510b (e.g., a second external electronic device located close to the second subject) are determined, the electronic device 1501 may provide the third graphic object 1570 in a floating form. The electronic device 1501 may display information on a first shared external electronic device related to the first subject 1510a among a plurality of shared external electronic devices as an indicator 1570a on the third graphic object 1570 in order (e.g., the order of the positions of the subjects). When the third graphic object 1570 that displays information ("T" (Tina)) on the first shared external electronic device as an indicator 1570a is selected, the photographed image may be transmitted to the first shared external electronic device. After transmitting the photographed image to the first shared external electronic device, the electronic device 1501 may display information ("A" (Andrew)) on a second shared external electronic device related to the second subject 1510b among the plurality of shared external electronic devices on the third graphic object 1570 as an indicator 1570b according to the following order, and transmit a photographed image to the second shared external electronic device when the third graphic object 1570 that displays information on the second shared external electronic device as an indicator 1570b is selected.

When a first unique external electronic device related to the first subject 1510a (e.g., a first external electronic device located close to the first subject) and a second shared external electronic device related to the second subject 1510b (e.g., a second external electronic device located close to the second subject) are determined, the electronic device 1501 may automatically transmit a photographed image to the plurality of shared external electronic devices according to an input of the third graphic object 1570 in a floating form. The electronic device 1501 may display information ("T") on the first shared external electronic device on the third graphic object 1570 while automatically transmitting the photographed image to a first shared external electronic device among the plurality of shared external electronic devices, and provide an indicator 1580a that displays a time progress indicating a transmission state of the photographed image transmitted to the first shared external electronic device over time in a predetermined area (e.g., an outer area) e1 of the third graphic object 1570. When the transmission of the photographed image to the first shared external electronic device is completed, the electronic device 1501 may automatically start transmitting the photographed image to the second shared external electronic device. The electronic device 1501 may display information ("A") about the second shared external electronic device on the third graphic object 1570 while automatically transmitting the photographed image to the second shared external electronic device, and provide an indicator 1580b that displays a time progress indicating a transmission state of the photographed image transmitted to the second shared external electronic device over time in a predetermined area (e.g., an outer area) e2 of the third graphic object 1570. When the third graphic object 1570 is input again while transmitting the photographed image to the plurality of shared external electronic devices, the electronic device 1501 may stop the transmission operation to the plurality of shared external electronic devices.

The electronic device 1501 may display a fifth graphic object 1590 for storing a photographed image in a memory, and the fifth graphic object 1590 may not display an indicator in a fixed form.

The electronic device 1501 may search for a plurality of peripheral external electronic devices capable of performing communication through a UWB communication module that is a first communication module (e.g., the first communication module 291 of FIG. 2), detect distances and/or positions of a plurality of external electronic devices based on location information for each of the plurality of external electronic devices, and provide a sixth graphic object 1595 displaying an indicator (e.g., a Mini-Map) including a plurality of location icons representing each of the plurality of external electronic devices. The electronic device 1501 may display an indicator that distinguishes a plurality of location icons corresponding to a plurality of external electronic devices into a location icon indicating a shared external electronic device included in the shared area c1 mapped to the angle of view range A1 of the camera and a location icon indicating a non-shared external electronic device included in the non-shared area c2 that is not mapped to the field-of-view range A1 of the camera, on the sixth graphic object.

The electronic device 1501 may determine the sharing area c1, based on the first direction information (e.g., AOA information) of the external electronic device measured by the plurality of patch elements (e.g., the first to third patch elements 411 to 415 of FIG. 4). The electronic device 201 may determine the non-shared area c2, based on the second direction information (e.g., AOA information) of the external electronic device positioned around 360 degrees around the electronic device 201 measured by the plurality of patch elements (e.g., the first to third patch elements 411 to 415 of FIG. 4) and the additional UWB antenna.

Figure 16:
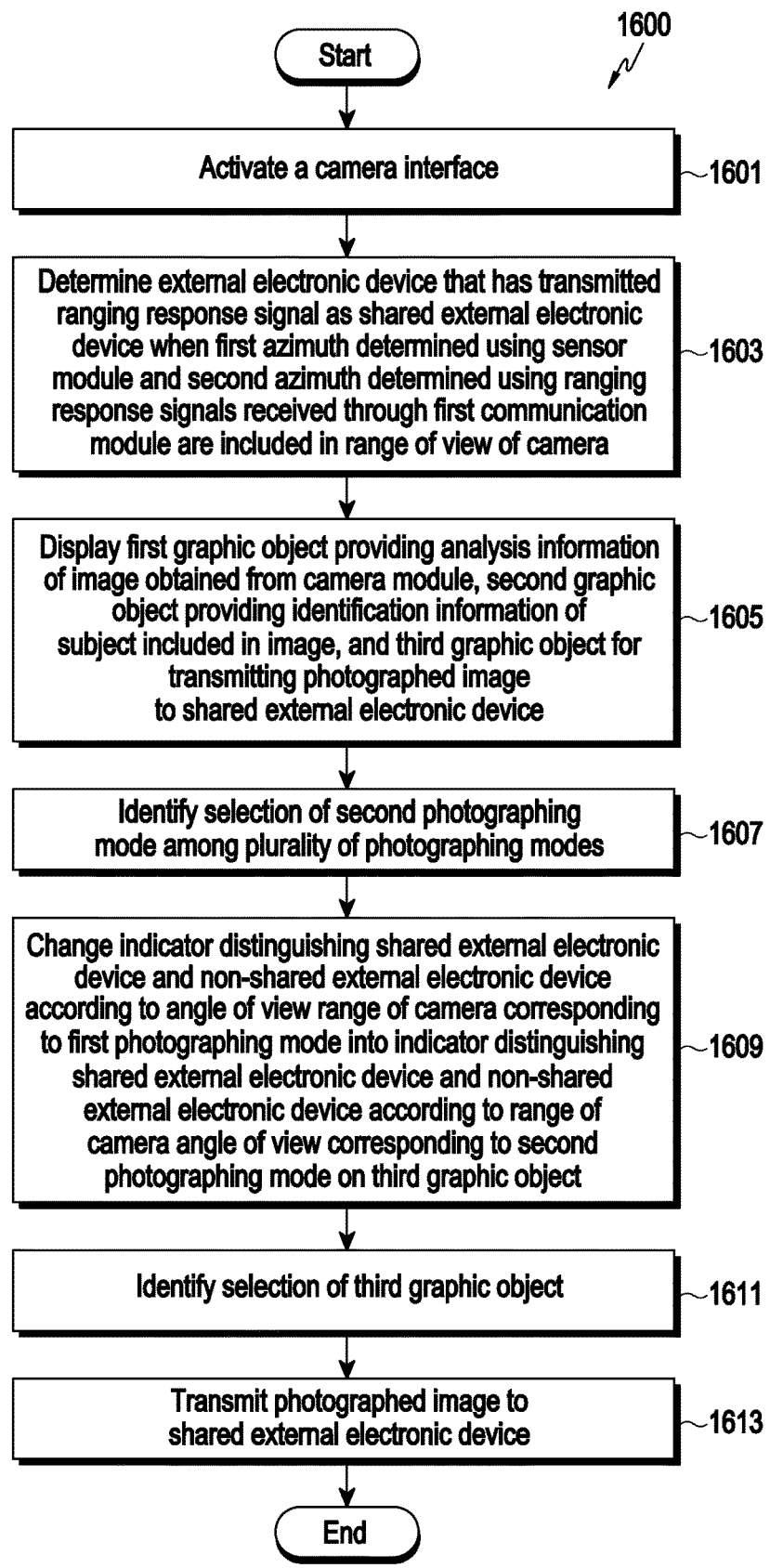
FIG. 16 is a flowchart illustrating an image transmission operation in an electronic device, according to various embodiments.

FIG. 16 is a flowchart 1600 illustrating an image transmission operation in an electronic device according to various embodiments. The image transmission operations may include operations 1601 to 1613. According to an embodiment, at least one of operations 1601 to 1613 may be omitted, the order of some operations may be changed, or another operation may be added. The image transmission operations may be performed by the electronic device 101 of FIG. 1, the processor 120 of FIG. 1, the electronic device 201 of FIG. 2, or the processor 220 of FIG. 2.

In operation 1601, the electronic device 201 may activate a camera interface according to a user request signal.

According to an embodiment, the electronic device 201 may activate a camera module (e.g., the camera module 280 of FIG. 2) when the camera interface is activated according to the user's request, and display the image obtained from the camera module on the camera interface.

In operation 1603, the electronic device 201 may determine the external electronic device that has transmitted the ranging response signal as the shared external electronic device when a first azimuth angle determined using a sensor module (e.g., the sensor module 276 of FIG. 2) and a second azimuth angle determined using the ranging response signals received through the plurality of antennas of the first communication module (e.g., the first communication module 291 of FIG. 2) are included in the range of view of the camera.

According to an embodiment, the electronic device 201 may determine a first azimuth angle including a photographing direction of the electronic device 201 that is a relative orientation from the magnetic north direction, which may be referred to as an absolute orientation, based on the raw data received from the sensor module. The electronic device 201 may determine direction information (e.g., angle of arrival (AOA)) of the external electronic device using a plurality of ranging response signals received from the external electronic device through the first communication module, and determine the second azimuth angle, based on the difference in the azimuth between the magnetic north direction, which may be referred to as an absolute bearing, and the direction information (e.g., angle of arrival (AOA)) of the external electronic device, which is a relative direction, which may be obtained through the sensor module.

According to an embodiment, the electronic device 201 may identify the camera field of view range corresponding to the currently activated photographing mode among multiple photographing modes (e.g., ultra-wide mode, wide mode, telephoto mode, panorama mode, single take mode, and/or video mode).

In operation 1605, the electronic device 201 may display a first graphic object that provides analysis information of the image acquired from the camera module (e.g., the camera module 280 in FIG. 2), a second graphic object providing identification information of a subject included in the image, and/or a third graphic object for transmitting a photographed image to a shared external electronic device on the camera interface.

According to an embodiment, the electronic device 201 may analyze the image acquired from the camera module on the camera interface and display a first graphic object (e.g., a scene message) corresponding to the analysis result.

According to an embodiment, the electronic device 201 may display a second graphic object that provides identification information (e.g., name information corresponding to face authentication information) on the subject included in the image acquired from the camera module 280 in an area adjacent to the subject displayed in the image on the camera interface.

According to an embodiment, the electronic device 201 may determine a plurality of external electronic devices capable of communicating with a UWB communication module that is a first communication module (e.g., the first communication module 291 of FIG. 2). The electronic device 201 may display an indicator that divides the determined plurality of external electronic devices into a shared external electronic device in which the first azimuth angle and the second azimuth angle are included within a range of an angle of view of a camera corresponding to a currently set first photographing mode (e.g., a wide mode) and a non-shared external electronic device in which the first azimuth angle and the second azimuth angle are not included within the range of the camera's angle of view, on the third graphic object.

In operation 1607, the electronic device 201 may identify selection of a second photographing mode (e.g., a telephoto mode) among a plurality of photographing modes.

According to an embodiment, the electronic device 201 may activate a default first photographing mode (e.g., a wide photographing mode) according to activation of the camera interface, and provide a graphic object for each of a plurality of photographing modes (e.g., ultra-wide mode, wide mode, telephoto mode, panorama mode, single take mode and/or video mode) that may be selected by a user on the camera interface.

In operation 1609, the electronic device 201 may change the indicator that distinguishes a shared external electronic device and a non-shared external electronic device according to the angle of view range of the camera corresponding to the first photographing mode (e.g., wide mode) into an indicator that distinguishes a shared external electronic device and a non-shared external electronic device according to a range of a camera angle of view corresponding to the second photographing mode (e.g., a telephoto mode) on the third graphic object.

According to an embodiment, the electronic device 201 may display a location icon indicating the shared external electronic device in a shared area (e.g., the shared area c1 of FIG. 17) mapped to the angle of view range of the camera corresponding to the first photographing mode, and adjust direction information (e.g., AOA information) of the external electronic device in order to map the same to the field of view range of the camera corresponding to the second photographing mode, when changing to the second photographing mode while displaying the indicator (e.g., indicator 1770a of FIG. 17) that displays a location icon indicating a non-shared external electronic device in a non-shared area (e.g., non-shared area c2 of FIG. 17) that is not mapped to the range of view angle of the camera. The electronic device 210 may change the shared area and the non-shared area, based on the direction information (e.g., AOA information) of the external electronic device adjusted to be mapped to the range of view angle of the camera corresponding to the second photographing mode. The electronic device 201 may display a location icon indicating the shared external electronic device in the changed sharing area (e.g., the sharing area c1 in FIG. 17) mapped to the angle of view range of the camera corresponding to the second photographing mode, and display an indicator (e.g., the indicator 1770b of FIG. 17) that displays a location icon indicating a non-shared external electronic device in the changed non-shared area (e.g., non-shared area c2 of FIG. 17) that is not mapped to the range of view of the camera) on the third graphic object. The electronic device 201 may determine a shared area (e.g., the shared area c1 of FIG. 17), based on the first direction information (e.g., first AOA information) of the external electronic device measured by the plurality of patch elements (e.g., the first to third patch elements 411 to 415 of FIG. 4). The electronic device 201 may determine a non-shared area (e.g., the non-shared area c2 of FIG. 17), based on second direction information (e.g., second AOA information) of an external electronic device positioned around 360 degrees around the electronic device 201 measured by a plurality of patch elements (e.g., the first to third patch elements 411 to 415 in FIG. 4) and an additional UWB antenna.

In operation 1611, the electronic device 201 may identify the selection of the third graphic object in the camera interface.

In operation 1613, the electronic device 201 may transmit the photographed image to the shared external electronic device in response to the selection of the third graphic object.

According to an embodiment, in response to the selection of the third graphic object, the electronic device 201 may detect an image corresponding to a selection time of a third graphic object in a memory (e.g., the memory 230 of FIG. 2) storing an image obtained from a camera module (e.g., the camera module 280 of FIG. 2) from a camera interface activation time, as a photographed image, and convert the photographed image according to a specified transmission method and automatically transmit the converted image to the shared external electronic device.

According to an embodiment, in response to the selection of the third graphic object, the electronic device 201 may photograph an image obtained from a camera module (e.g., the camera module 280 of FIG. 2), store the photographed image in a memory (e.g., the memory 230 of FIG. 2), and convert the photographed image stored in the memory according to a specified transmission method and automatically transmit the converted image to the shared external electronic device.

FIG. 17 is a diagram 1700 illustrating an image transmission operation in an electronic device according to various embodiments.

Referring to FIG. 17, when a camera interface (e.g., a preview mode of a camera) is activated and the camera interface is shown on the display, the electronic device 1701 (e.g., the electronic device 101 of FIG. 1, the electronic device 201 of FIG. 2, the electronic device 401 of FIG. 4, or the electronic device 701 of FIG. 7) may display an image 1710 acquired from a camera module (e.g., the camera module 280 of FIG. 2) on the camera interface, and display a first graphic object 1730 that provides analysis information of the image acquired from the camera module, second graphic objects 1750a, 1750b providing identification information of the subjects 1710a, 1710b included in the image 1710, and/or a third graphic object 1770 for transmitting a photographed image to a shared external electronic device.

The electronic device 1701 may analyze the image acquired from the camera module on the first graphic object 1730, and display the first graphic object corresponding to the analysis result as a scene message. As a result of analyzing the image 1710 obtained from the camera module, the electronic device 1701 may determine that the subjects 1710a and 1710b included in the image are people, and display the information related to the person as the first graphic object 1730.

The electronic device 1701 may analyze the image 1710 obtained from the camera module, and recognize the faces of the subjects 1710a and 1710b using a face recognition function when it is determined that the subject included in the image 1710 is a human as a result of the analysis. The electronic device 1701 may identify that there is face authentication information in which the first subject 1710a is registered among the subjects 1710a and 1710b using the face recognition function, and display the message "Andrew's face" indicating identification information in an area adjacent to the first subject 1710a displayed in the image 1710 as the second graphic object 1750a. The electronic device 1701 may identify that there is face authentication information in which the second subject 1710b is registered among the subjects 1710a and 1710b using the face recognition function, and display a "Tina's face" message indicating identification information in an area adjacent to the second subject 1710b displayed in the image 1710 as the second graphic object 1750b.

The electronic device 1701 may determine a plurality of peripheral external electronic devices capable of performing communication through a UWB communication module that is a first communication module (e.g., the first communication module 291 of FIG. 2), and display an indicator that divides the plurality of external electronic devices into a location icon corresponding to the shared external electronic device included in the shared area c1 mapped to the range A1 of the camera angle corresponding to the photographing mode and a location icon corresponding to the non-shared external electronic device included in the non-shared area c2 that is not mapped to the field-of-view range A1 of the camera, on the third graphic object 1770.

When a tele mode is selected from the graphic object 1790 corresponding to the plurality of photographing modes provided by the camera interface, the electronic device 1701 may display an indicator 1770a that distinguishes a location icon corresponding to the shared external electronic device included in the shared area c1 mapped to the angle of view range A1 of the camera corresponding to the tele mode and a location icon corresponding to the non-shared external electronic device included in the non-shared area c2 that is not mapped to the field-of-view range A1 of the camera, on the third graphic object 1770.

When an ultra-wide mode is selected from the graphic object 1790 corresponding to the plurality of photographing modes provided by the camera interface, the electronic device 1701 may display an indicator 1770b that distinguishes a location icon corresponding to the shared external electronic device included in the shared area c1 mapped to the angle of view range A1 of the camera corresponding to the ultra-wide mode and a location icon corresponding to the non-shared external electronic device included in the non-shared area c2 that is not mapped to the field-of-view range A1 of the camera, on the third graphic object 1770.

When a wide-angle photographing mode is selected from the graphic object 1790 corresponding to a plurality of photographing modes provided by the camera interface, the electronic device 1701 may display an indicator 1770c that distinguishes a location icon corresponding to the shared external electronic device included in the shared area c1 mapped to the field-of-view range A1 of the camera corresponding to the wide mode and a location icon corresponding to the non-shared external electronic device included in the non-shared area c2 that is not mapped to the field-of-view range A1 of the camera, on the third graphic object 1770.

When a panoramic photographing mode is selected from the graphic object 1790 corresponding to a plurality of photographing modes provided by the camera interface, the electronic device 1701 may display an indicator 1770*d* that distinguishes a location icon corresponding to the shared external electronic device included in the shared area c1 mapped to the angle of view range A1 of the camera corresponding to the panorama mode and a location icon corresponding to the non-shared external electronic device included in the non-shared area c2 that is not mapped to the field-of-view range A1 of the camera, on the third graphic object 1770.

When displaying the location icon corresponding to the shared external electronic device in the sharing area c1 matching the range of view angle of the camera corresponding to the photographing mode selected by the user in the graphic object 1790 corresponding to the plurality of photographing modes provided by the camera interface, the electronic device 1701 may distinguish and display a first shared external electronic device (e.g., a first external electronic device located close to the first subject) related to the first subject 1710*a* and a second shared external electronic device (e.g., a second external electronic device located close to the second subject) related to the second subject 1710*b*.

Figure 18:
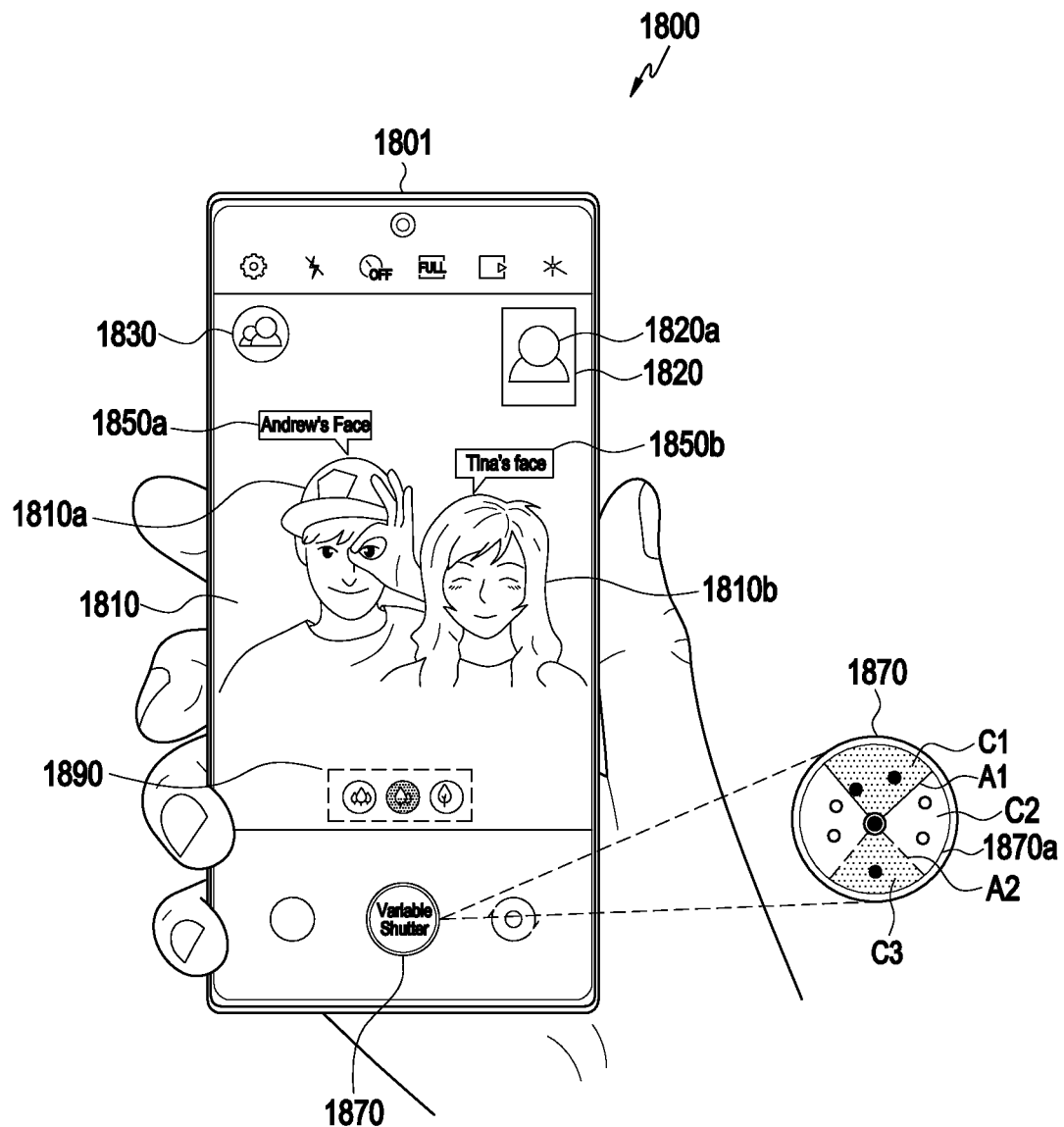
FIG. 18 is a diagram illustrating an image transmission operation in an electronic device, according to various embodiments.

FIG. 18 is a diagram 1800 illustrating an image transmission operation in an electronic device according to various embodiments.

Referring to FIG. 18, when the camera interface (e.g., the preview mode of the camera) is activated and the camera interface is displayed on the display, the electronic device 1801 (e.g., electronic device 101 of FIG. 1, electronic device 201 of FIG. 2, the electronic device 401 of FIG. 4, or the electronic device 701 of FIG. 7) may display the first image 1810 obtained from the rear camera of the camera module (e.g., the camera module 280 of FIG. 2) on the camera interface, and display the second image 1820 obtained from the front camera of the camera module (e.g., the camera module 280 of FIG. 2). The electronic device 1801 may display a first graphic object 1830 that provides analysis information of the first image 1810 obtained from the rear camera of the camera module, second graphic objects 1850*a*, 1850*b* providing identification information of the subjects 1810*a*, 1810*b* included in the first image 1810, and/or a third graphic object 1870 for transmitting a photographed image to a shared external electronic device on a camera interface. The electronic device 1801 may provide a first graphic object (not shown) providing analysis information of the second image 1820 obtained from the front camera of the camera module, and a second graphic object (not shown) providing identification information of the subjects 1820*a* included in the second image 1820.

The electronic device 1801 may display an indicator including a plurality of location icons indicating each of a plurality of peripheral external electronic devices capable of transmitting and/or receiving a UWB signal through a first communication module (e.g., the first communication module 291 of FIG. 2) on the third graphic object 1870. The electronic device 1801 may display an indicator 1870*a* including a first shared area c1 mapped to the field of view range A1 of the rear camera corresponding to the currently activated first photographing mode (e.g., wide mode), a non-shared area c2 that is not mapped to the field-of-view range A1 of the rear camera and the field-of-view range A2 of the front camera corresponding to the first photographing mode (e.g., wide mode), and a second shared area c3 mapped to the angle of view range A2 of the front camera corresponding to the first photographing mode (e.g., wide mode), on the third graphic object 1870. The electronic device 1801 may display location icons indicating a plurality of first shared external electronic devices related to the subjects 1810*a* to 1810*b* included in the first image 1810 in the first sharing area c1, display a location icon indicating a second shared external electronic device related to the subject 1820*a* included in the second image 1820 in the second sharing area c3, and display a location icon corresponding to a non-shared external electronic device that is not included in the first shared area c1 and the second shared area c3 among a plurality of external electronic devices detected through the UWB signal in the non-shared area c2.

According to various embodiments, a method of transmitting an image of an electronic device may include determining, when the camera interface is activated, a shared external electronic device, based on photographing direction information of the electronic device determined based on sensor information received from the sensor module (e.g., the sensor module 276 of FIG. 2), direction information of the external electronic device determined based on the first signal (e.g., ranging response signal) received through the first communication module (e.g., the first communication module 291 of FIG. 2), and angle of view information of a camera; and transmitting, when a graphic object provided by the camera interface is selected, a photographed image to the determined external electronic device.

According to various embodiments, determining a first azimuth angle according to photographing direction information of the electronic device based on the sensor information received from the sensor module; determining a second azimuth angle according to direction information of the external electronic device based on a first signal (e.g., ranging response signal) received from the external electronic device through a plurality of antennas used by the first communication module; and determining the external electronic device as a shared external electronic device when the first azimuth angle and the second azimuth angle are included in the range of the camera angle of view may be further included.

According to various embodiments, the determining the second azimuth angle may include determining the second azimuth angle based on angle of arrival (AOA) information calculated using the first signal received through the first communication module.

According to various embodiments, identifying the rotationally mounted state of the electronic device; transmitting and/or receiving the first signal through at least two antennas aligned in a horizontal axis among a plurality of antennas used by the first communication module when the rotationally mounted state of the electronic device is the vertical rotationally mounted state; and transmitting and/or receiving the first signal through at least two antennas aligned in a vertical axis among a plurality of antennas used by the first communication module when the rotationally mounted state of the electronic device is the horizontal rotationally mounted state may be further included.

According to various embodiments, activating the first communication module based on the first information received from the external electronic device through the second communication module may be further included.

According to various embodiments, providing a first graphic object providing analysis information of an image obtained from the camera module in the camera interface, a second graphic object providing identification information for a subject included in the image, and a third graphic object for transmitting a photographed image to the shared external electronic device may be further included.

According to various embodiments, displaying different indicators on the third graphic object, based on at least one of the image analysis information acquired from the camera module, the location information of the shared external electronic device, and the identification information of the external electronic device received through the second communication module may be further included.

According to various embodiments, displaying a fourth graphic object for selecting a shared external electronic device for image transmission among the plurality of shared external electronic devices on the camera interface when a plurality of shared external electronic devices are determined may be further included.

According to various embodiments, displaying, as an indicator, information on a first shared external electronic device among the plurality of shared external electronic devices on the third graphic object when a plurality of shared external electronic devices are determined; transmitting the photographed image to the first shared external electronic device when the third graphic object is selected; displaying, as an indicator, information on a second shared external electronic device among the plurality of shared external electronic devices on the third graphic object when the photographed image is transmitted to the first shared external electronic device; and transmitting the photographed image to the second shared external electronic device when the third graphic object is selected may be included.

According to various embodiments, displaying a plurality of external electronic devices capable of communication through the first communication module according to the angle of view range corresponding to the photographing mode of the camera module as an indicator divided into a shared external electronic device and a non-shared external electronic device on the third graphic object may be further included.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a first communication module;
a sensor module;
a camera module configured to capture a photographed image; and
at least one processor, and
memory storing instructions that, when executed by the at least one processor individually or collectively, cause the electronic device to:
determine photographing direction information of the electronic device based on sensor information received from the sensor module,
determine direction information of an external electronic device based on a first signal received through the first communication module,
in case that a camera interface is activated, determine a shared external electronic device based on the photographing direction information, the direction information of the external electronic device, and angle of view information of a camera,
provide, in the camera interface for transmitting the photographed image, a graphic object that displays a shared area corresponding to a range of view angle of the camera module and displays one or more indicators identifying the determined shared external electronic device in the shared area, and
transmit the photographed image to the determined shared external electronic device in case that the graphic object provided by the camera interface is selected.

2. The electronic device of claim 1,
wherein the instructions, when executed by the at least one processor individually or collectively, cause the electronic device to:
determine a first azimuth angle according to the photographing direction information of the electronic device,
determine a second azimuth angle according to the direction information of the external electronic device based on the first signal received from the external electronic device through a plurality of antennas used by the first communication module, and
determine the external electronic device as the determined shared external electronic device in case that the first azimuth angle and the second azimuth angle are included in a range of the angle of view information of the camera.

3. The electronic device of claim 1,
wherein the instructions, when executed by the at least one processor individually or collectively, cause the electronic device to:
identify a rotationally mounting state of the electronic device,
in case that the rotationally mounting state of the electronic device is a vertical rotationally mounted state, transmit and receive the first signal through at least two antennas aligned in a horizontal axis among a plurality of antennas used by the first communication module, and
in case that the rotationally mounting state of the electronic device is a horizontally rotationally mounted state, transmit and receive the first signal through at least two other antennas aligned with a vertical axis among the plurality of antennas used by the first communication module.

4. The electronic device of claim 1,
wherein the instructions, when executed by the at least one processor individually or collectively, cause the electronic device to:
provide, in the camera interface, a first graphic object providing analysis information of an image obtained from the camera module,
provide, in the camera interface, a second graphic object providing identification information for a subject included in the image, and
provide, in the camera interface, a third graphic object for transmitting the photographed image to the determined shared external electronic device.

5. The electronic device of claim 4,
wherein the instructions, when executed by the at least one processor individually or collectively, cause the electronic device to:
display different indicators on the third graphic object, based on at least one of the analysis information of the image acquired from the camera module, location information of the determined shared external electronic device, and identification information of the determined shared external electronic device received through a second communication module of the electronic device.

6. The electronic device of claim 4,
wherein the instructions, when executed by the at least one processor individually or collectively, cause the electronic device to:
display, on the camera interface, a fourth graphic object for selecting a first shared external electronic device for image transmission among a plurality of shared external electronic devices in case of determining the plurality of shared external electronic devices.

7. The electronic device of claim 4,
wherein the instructions, when executed by the at least one processor individually or collectively, cause the electronic device to:
display, on the third graphic object, information on a first shared external electronic device among a plurality of shared external electronic devices as an indicator in case of determining the plurality of shared external electronic devices,
transmit the photographed image to the first shared external electronic device in case that the third graphic object is selected,
display, on the third graphic object, information on a second shared external electronic device among the plurality of shared external electronic devices as an indicator in case that the photographed image is transmitted to the first shared external electronic device, and
transmit the photographed image to the second shared external electronic device in case that the third graphic object is selected.

8. The electronic device of claim 4,
wherein the instructions, when executed by the at least one processor individually or collectively, cause the electronic device to:
display, on the third graphic object, an indicator that divides a plurality of external electronic devices capable of communication through the first communication module into a shared external electronic device and a non-shared external electronic device according to a range of view angle corresponding to a photographing mode of the camera.

9. A method of transmitting an image of an electronic device, the method comprising:
determining photographing direction information of the electronic device based on sensor information received from a sensor module of the electronic device;
determining direction information of an external electronic device based on a first signal received through a first communication module of the electronic device;
determining, in case that a camera interface is activated, a shared external electronic device, based on the photographing direction information of the electronic device, the direction information of the external electronic device, and angle of view information of a camera;
providing, in the camera interface for transmitting the photographed image, a graphic object that displays a shared area corresponding to a range of view angle of a camera module of the electronic device and displays one or more indicators identifying the determined shared external electronic device in the shared area; and
transmitting, in case that the graphic object provided by the camera interface of the electronic device is selected, a photographed image to the determined shared external electronic device.

10. The method of claim 9, further comprising:
determining a first azimuth angle according to the photographing direction information of the electronic device;
determining a second azimuth angle according to the direction information of the external electronic device based on the first signal received from the external electronic device through a plurality of antennas used by the first communication module; and
determining the external electronic device as the determined shared external electronic device in case that the first azimuth angle and the second azimuth angle are included in a range of the angle of view information of the camera.

11. The method of claim 9, further comprising:
identifying a rotationally mounted state of the electronic device;
in case that the rotationally mounting state of the electronic device is a vertical rotationally mounted state, transmitting and receiving the first signal through at least two antennas aligned in a horizontal axis among a plurality of antennas used by the first communication module; and
in case that the rotationally mounting state of the electronic device is a horizontal rotationally mounted state, transmitting and receiving the first signal through at least two other antennas aligned in a vertical axis among the plurality of antennas used by the first communication module.

12. The method of claim 9, further comprising:
providing, in the camera interface, a first graphic object providing analysis information of an image obtained from the camera module of the electronic device;
providing, in the camera interface, a second graphic object providing identification information for a subject included in the image; and
providing, in the camera interface, a third graphic object for transmitting the photographed image to the determined shared external electronic device.

13. The method of claim 12, further comprising:
displaying, on the camera interface, a fourth graphic object for selecting a first shared external electronic device for image transmission among a plurality of shared external electronic devices in case that determining the plurality of shared external electronic devices are determined.

14. The method of claim 12, further comprising:
displaying, on the third graphic object as an indicator, information on a first shared external electronic device among a plurality of shared external electronic devices in case that the plurality of shared external electronic devices are determined;
transmitting the photographed image to the first shared external electronic device in case that the third graphic object is selected;
displaying, on the third graphic object as an indicator, information on a second shared external electronic device among the plurality of shared external electronic devices in case that the photographed image is transmitted to the first shared external electronic device; and
transmitting the photographed image to the second shared external electronic device in case that the third graphic object is selected.

15. The method of claim 12, further comprising:
displaying, on the third graphic object as an indicator, a plurality of external electronic devices capable of communication through the first communication module according to an angle of view range corresponding to a photographing mode of the camera module divided into a shared external electronic device and a non-shared external electronic device.

16. The method of claim 12, further comprising:
displaying different indicators on the third graphic object, based on at least one of the analysis information of the image acquired from the camera module, location information of the determined shared external electronic device, and identification information of the determined shared external electronic device received through a second communication module of the electronic device.

17. A non-transitory computer-readable storage medium storing computer-executable instructions configured, when executed by one or more processors of an electronic device, to cause the electronic device to:
determine photographing direction information of the electronic device based on sensor information received from a sensor module of the electronic device;
determine direction information of an external electronic device based on a first signal received through a first communication module of the electronic device;
in case that a camera interface is activated, determine a shared external electronic device, based on the photographing direction information, the direction information of the external electronic device, and angle of view information of a camera;
provide, in the camera interface for transmitting the photographed image, a graphic object that displays a shared area corresponding to a range of view angle of a camera module of the electronic device and displays one or more indicators identifying the determined shared external electronic device in the shared area; and
transmit a photographed image to the determined shared external electronic device in case that the graphic object provided by the camera interface is selected.

18. The non-transitory computer-readable storage medium of claim 17, wherein the computer-executable instructions, when executed by the one or more processors of the electronic device, further cause the electronic device to:
   determine a first azimuth angle according to the photographing direction information of the electronic device;
   determine a second azimuth angle according to the direction information of the external electronic device based on the first signal received from the external electronic device through a plurality of antennas used by the first communication module, and
   determine the external electronic device as the determined shared external electronic device in case that the first azimuth angle and the second azimuth angle are included in a range of the angle of view information of the camera.

19. The non-transitory computer-readable storage medium of claim 17, wherein the computer-executable instructions, when executed by the one or more processors of the electronic device, further cause the electronic device to:
   identify a rotationally mounting state of the electronic device;
   in case that the rotationally mounting state of the electronic device is a vertical rotationally mounted state, transmit and receive the first signal through at least two antennas aligned in a horizontal axis among a plurality of antennas used by the first communication module; and
   in case that the rotationally mounting state of the electronic device is a horizontally rotationally mounted state, transmit and receive the first signal through at least two other antennas aligned with a vertical axis among the plurality of antennas used by the first communication module.

20. The non-transitory computer-readable storage medium of claim 17, wherein the computer-executable instructions, when executed by the one or more processors of the electronic device, further cause the electronic device to:
   provide, in the camera interface, a first graphic object providing analysis information of an image obtained from the camera module of the electronic device;
   provide, in the camera interface, a second graphic object providing identification information for a subject included in the image; and
   provide, in the camera interface, a third graphic object for transmitting the photographed image to the determined shared external electronic device.

* * * * *